US012565303B2

(12) United States Patent
Lewin et al.

(10) Patent No.: US 12,565,303 B2
(45) Date of Patent: Mar. 3, 2026

(54) UAV HAVING LOWER CARGO BAY DOOR(S)

(71) Applicant: Wing Aviation LLC, Mountain View, CA (US)

(72) Inventors: Jasper Lewin, Santa Cruz, CA (US); Jesse Blake, Palo Alto, CA (US)

(73) Assignee: Wing Aviation LLC, Palo Alto, CA (US)

( * ) Notice: Subject to any disclaimer, the term of this patent is extended or adjusted under 35 U.S.C. 154(b) by 250 days.

(21) Appl. No.: 17/979,548

(22) Filed: Nov. 2, 2022

(65) Prior Publication Data

US 2024/0140587 A1 May 2, 2024

(51) Int. Cl.
  B64C 1/22 (2006.01)
  B64D 1/22 (2006.01)
(52) U.S. Cl.
  CPC . B64C 1/22 (2013.01); B64D 1/22 (2013.01)
(58) Field of Classification Search
  CPC ............... B64D 1/10; B64D 1/12; B64C 1/22
  See application file for complete search history.

(56) References Cited

U.S. PATENT DOCUMENTS

| | | | | |
|---|---|---|---|---|
| 3,423,053 A | * | 1/1969 | Hawkshaw | B64D 1/16 |
| | | | | 116/215 |
| 3,966,144 A | | 6/1976 | Gabriel | |
| 4,936,389 A | * | 6/1990 | MacDonald | B64D 1/16 |
| | | | | 169/53 |
| 5,326,053 A | * | 7/1994 | Pahl | B64D 1/16 |
| | | | | 169/53 |
| 5,967,462 A | * | 10/1999 | Foster | B64D 1/16 |
| | | | | 244/105 |
| 8,640,782 B2 | * | 2/2014 | Parker | A62C 37/04 |
| | | | | 169/56 |
| 9,493,227 B2 | | 11/2016 | Helou, Jr. | |

(Continued)

FOREIGN PATENT DOCUMENTS

| | | |
|---|---|---|
| CN | 107985597 | 5/2018 |
| CN | 207617959 U | 7/2018 |
| WO | 01/083328 A1 | 11/2001 |

OTHER PUBLICATIONS

U.S. Appl. No. 17/979,641, filed Nov. 2, 2022, Wing Aviation LLC.

(Continued)

*Primary Examiner* — Marisa V Conlon
(74) *Attorney, Agent, or Firm* — McDonnell Boehnen Hulbert & Berghoff LLP

(57) ABSTRACT

A UAV having a fuselage body including a cavity that forms a cargo bay for transporting a payload, and a lower access opening providing an exit for the payload from the cargo bay, the lower access opening including a lower cargo bay door, an actuator positioned in the fuselage body, a linkage assembly connected to the actuator and connected to the lower cargo bay door, wherein the actuator and linkage assembly are operable to open and/or close the lower cargo bay door, wherein a first horn is mounted to the actuator, and wherein the linkage assembly includes a first linkage member having a first end and a second end, the first end of the first linkage member pivotally attached to the first horn and the second end of the first linkage member pivotally attached to the cargo bay door.

10 Claims, 29 Drawing Sheets

(56)  References Cited

U.S. PATENT DOCUMENTS

| | | | |
|---|---|---|---|
| 10,793,272 | B2 | 10/2020 | Shannon et al. |
| 11,186,368 | B2 | 11/2021 | Prager et al. |
| 11,279,484 | B2 * | 3/2022 | Klein ........................ B64D 1/18 |
| 11,759,664 | B2 * | 9/2023 | Trotter ..................... B64D 1/16 |
| | | | 169/53 |
| 2002/0084383 | A1 * | 7/2002 | Maeda ..................... B64D 1/16 |
| | | | 244/136 |
| 2004/0135031 | A1 | 7/2004 | Stupakis |
| 2019/0193855 | A1 | 6/2019 | Prager et al. |
| 2020/0010196 | A1 * | 1/2020 | Trotter ................. A62C 3/0228 |
| 2020/0207474 | A1 | 7/2020 | Foggia et al. |
| 2021/0171195 | A1 | 6/2021 | Yamato et al. |
| 2023/0271703 | A1 * | 8/2023 | Kilzer .................... G05D 1/101 |

OTHER PUBLICATIONS

International Search Report and Written Opinion for Int. App. No. PCT/US2023/036427, mailed Feb. 27, 2024.

* cited by examiner

UAV HAVING LOWER CARGO BAY DOOR(S)

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

The present embodiments are directed to an unmanned aerial vehicle (UAV) having a cargo bay positioned in a fuselage body of the UAV for housing a payload, and a lower cargo bay door positioned in the fuselage body. An actuator is positioned in the fuselage body operable to open and/or close the lower cargo bay door.

In one aspect, an unmanned aerial vehicle (UAV) is provided, including a fuselage body including a cavity that forms a cargo bay for transporting a payload, and a lower access opening providing an exit for the payload from the cargo bay, the lower access opening including a lower cargo bay door; an actuator positioned in the fuselage body; a linkage assembly connected to the actuator and connected to the lower cargo bay door; wherein the actuator and linkage assembly are operable to open and/or close the lower cargo bay door; wherein a first horn is mounted to the actuator; and wherein the linkage assembly includes a first linkage member having a first end and a second end, the first end of the first linkage member pivotally attached to the first horn and the second end of the first linkage member pivotally attached to the cargo bay door.

In another aspect, an unmanned aerial vehicle (UAV) is provided having a fuselage body including a cavity that forms a cargo bay for transporting a payload, and a lower access opening providing an exit for the payload from the cargo bay, the lower access opening including a lower cargo bay door; an actuator positioned in the fuselage body; a linkage assembly connected to the actuator and connected to the lower cargo bay door; wherein the actuator and linkage assembly are operable to open and/or close the lower cargo bay door; and wherein the linkage assembly includes an upwardly extending member that cooperates with the actuator, and the linkage assembly also includes a lower extending member attached to the upwardly extending member, the lower extending member having a first end pivotally attached to a first end of a first linkage arm; the first linkage arm having a second end pivotally attached to the lower cargo bay door.

In a further aspect, an unmanned aerial vehicle (UAV) is provided having a fuselage body including a cavity that forms a cargo bay for transporting a payload; and a lower access opening providing an exit for the payload from the cargo bay, the lower access opening including a lower cargo bay door; an upper access opening providing an entrance for the payload into the cargo bay, the upper access opening including an upper cargo bay door; an actuator positioned in the fuselage body; a cam coupled to the actuator so as to be rotatable by the actuator; a first linkage assembly connected to the actuator via the cam and connected to the lower cargo bay door; a second linkage assembly connected to the actuator via the cam and connected to the upper cargo bay door; wherein the actuator, cam, and first linkage assembly are operable to open and/or close the lower cargo bay door; wherein the actuator, cam, and second linkage assembly are operable to open and/or close the upper cargo bay door; and wherein the cam is rotatable by the actuator to: a first position where the upper cargo bay door is in an open position for receiving the payload, and the lower cargo bay door is in a closed position; a second position where the upper cargo bay door is in a closed position and the lower cargo bay door is in a closed position during transport, and a third position where the lower cargo bay door is in an open position for dropping the payload.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1A:
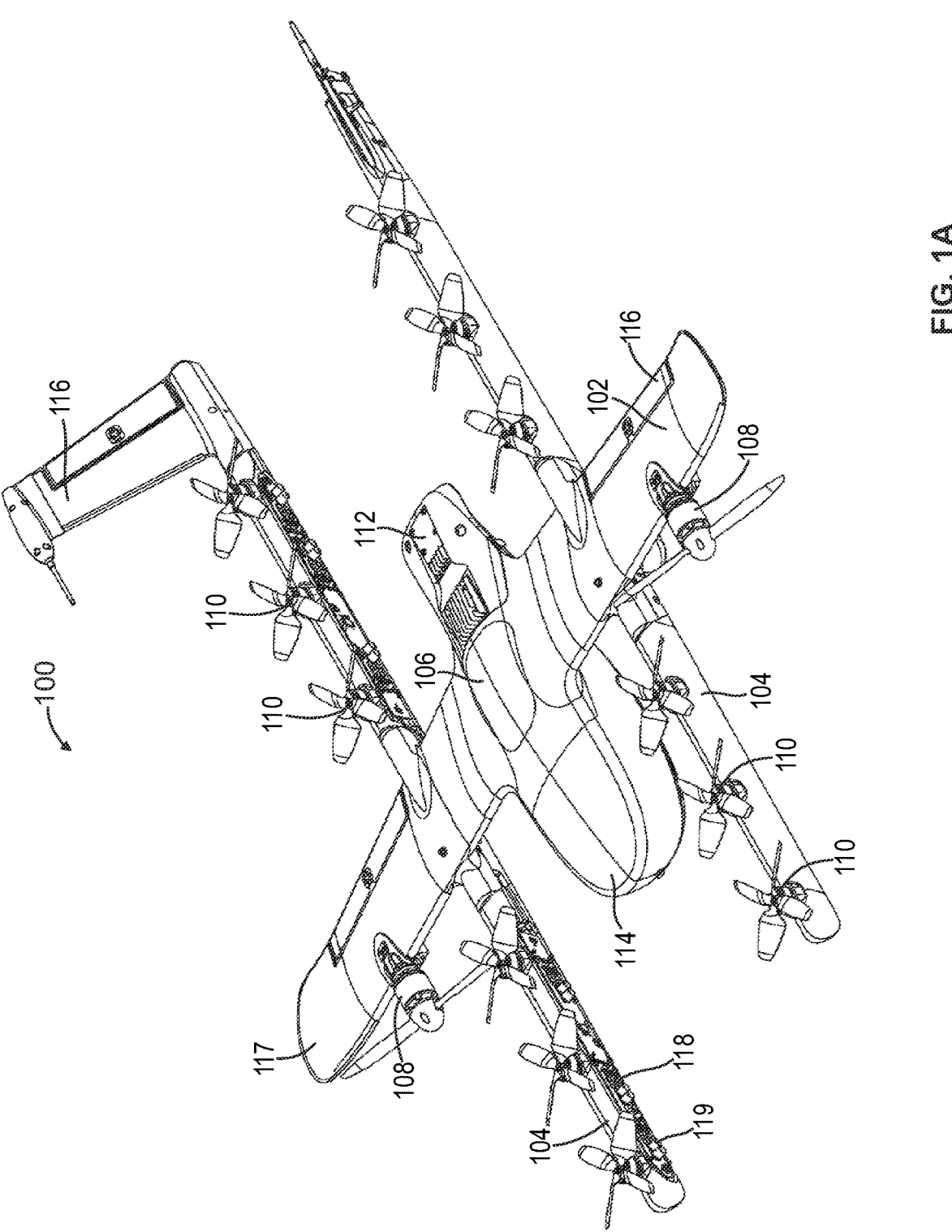
FIG. 1A is an isometric view of an example unmanned aerial vehicle 100, according to an example embodiment.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
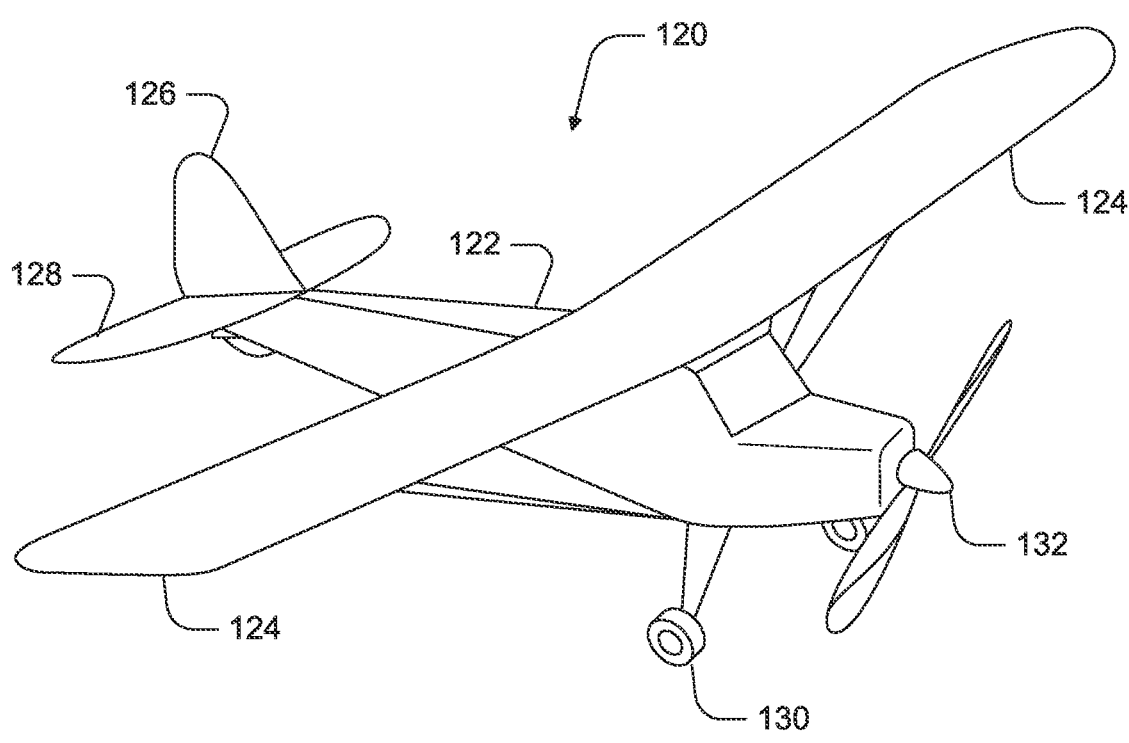
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
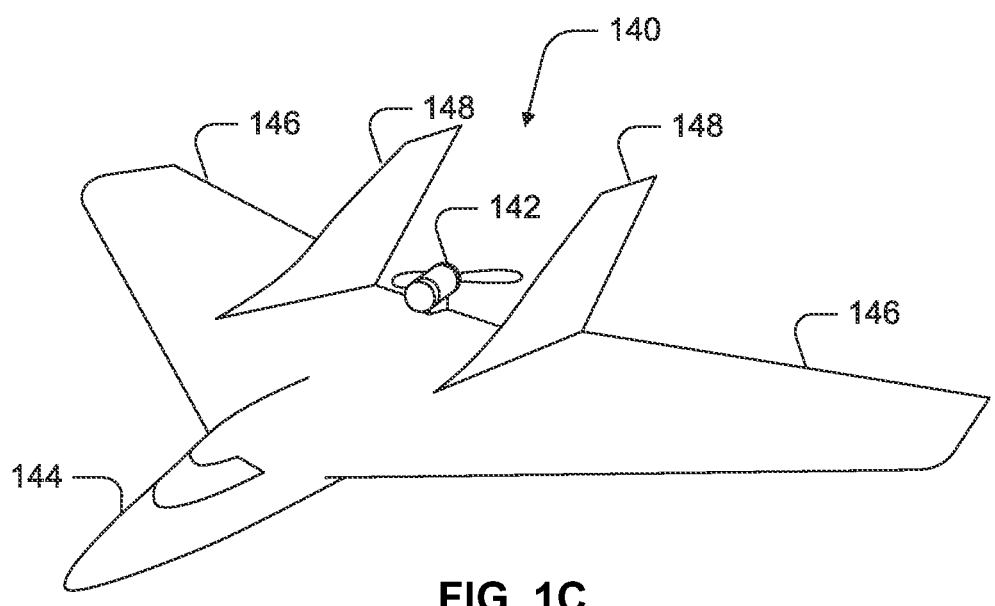
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
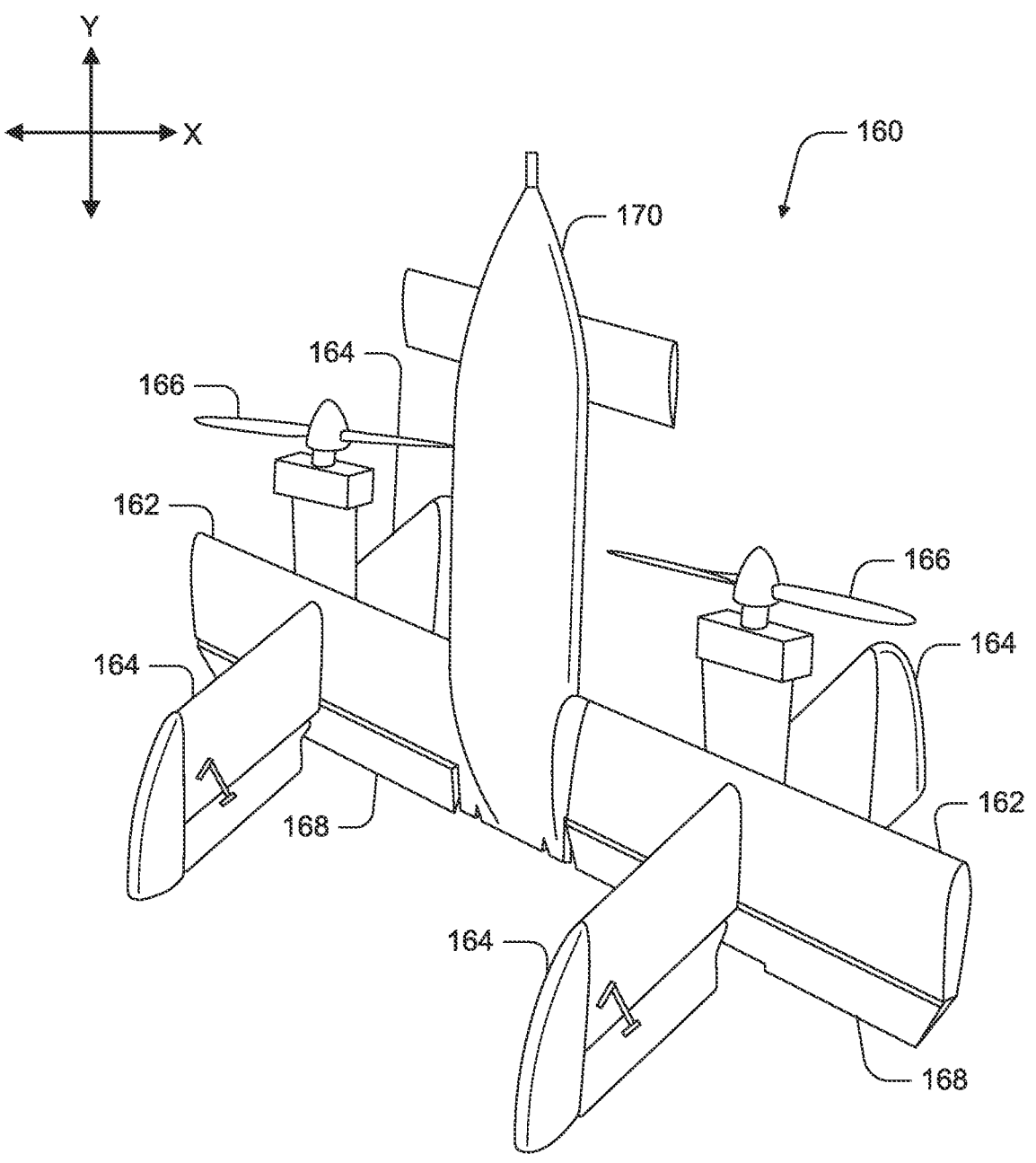
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D).

However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
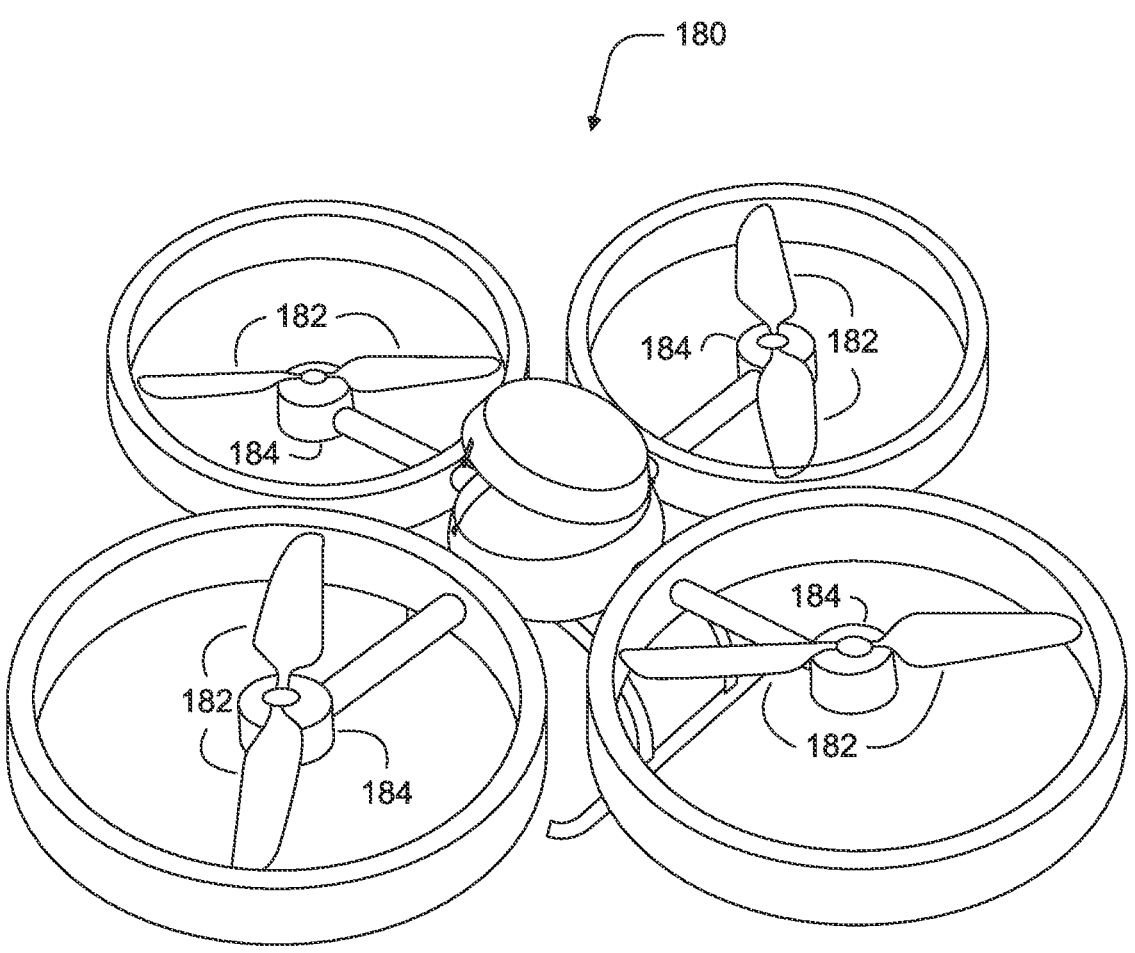
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

Figure 2:
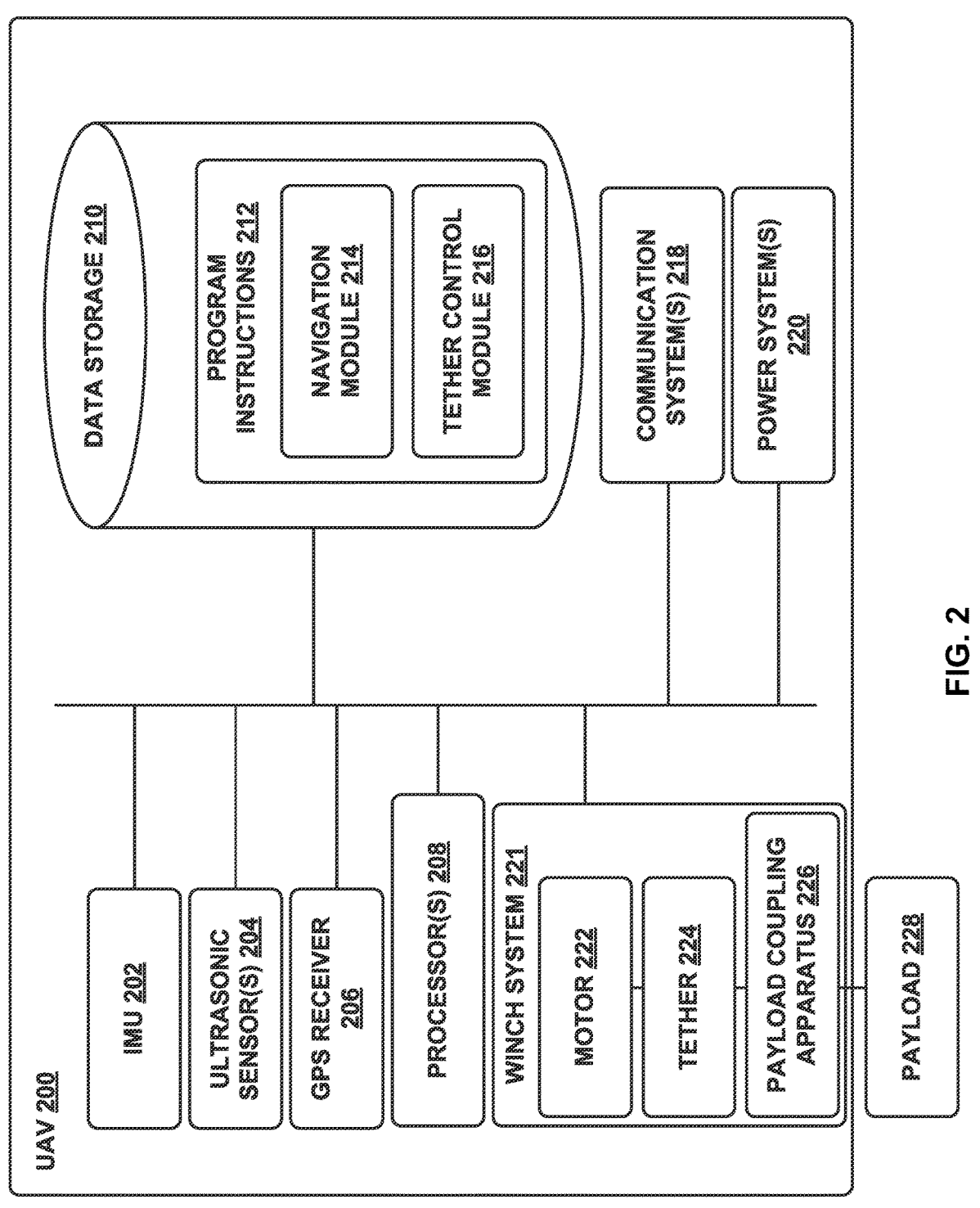
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may contain one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) caused by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operating rate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

Figure 3:
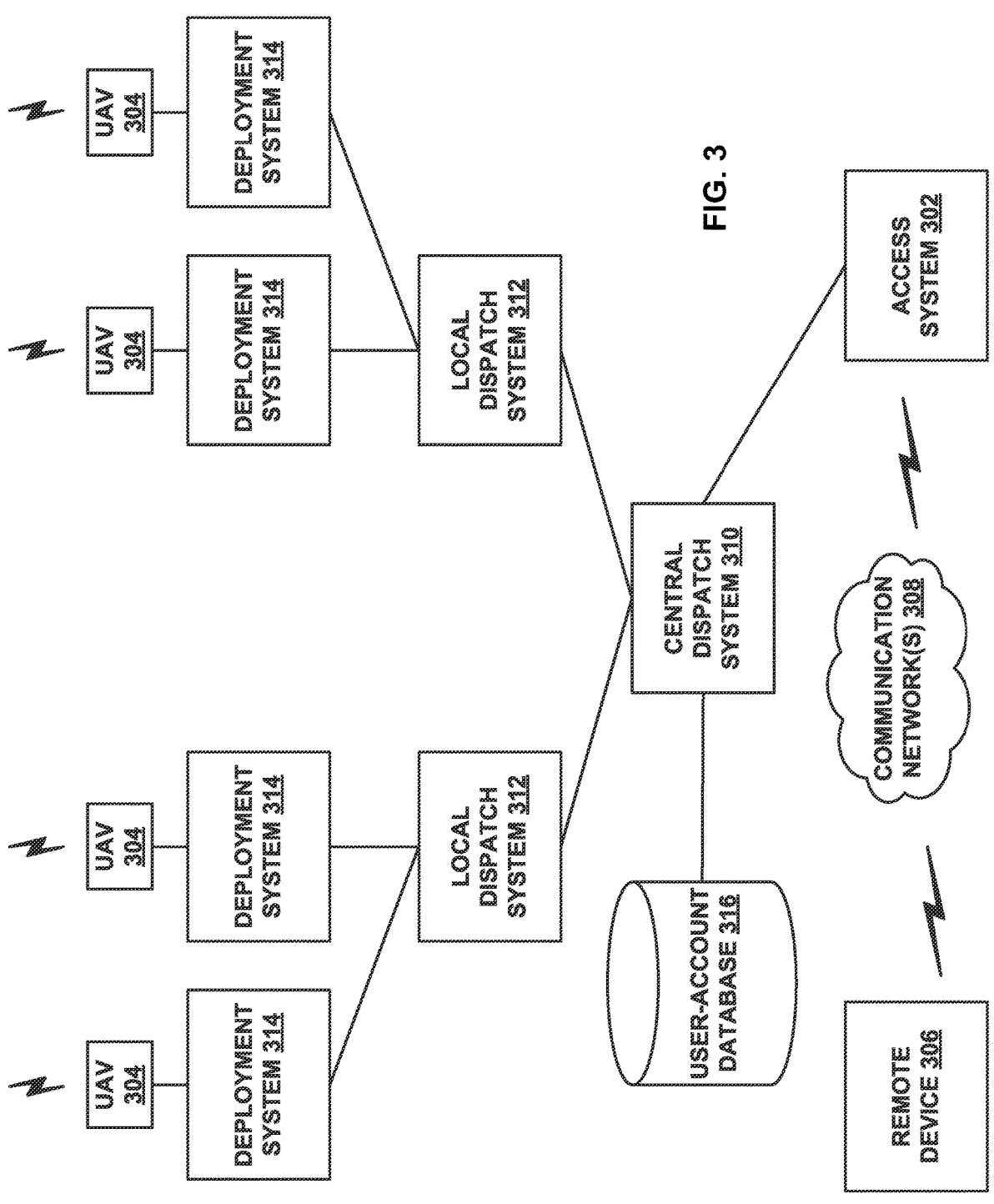
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems

312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system (s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

Figures 4A, 4B, 4C:
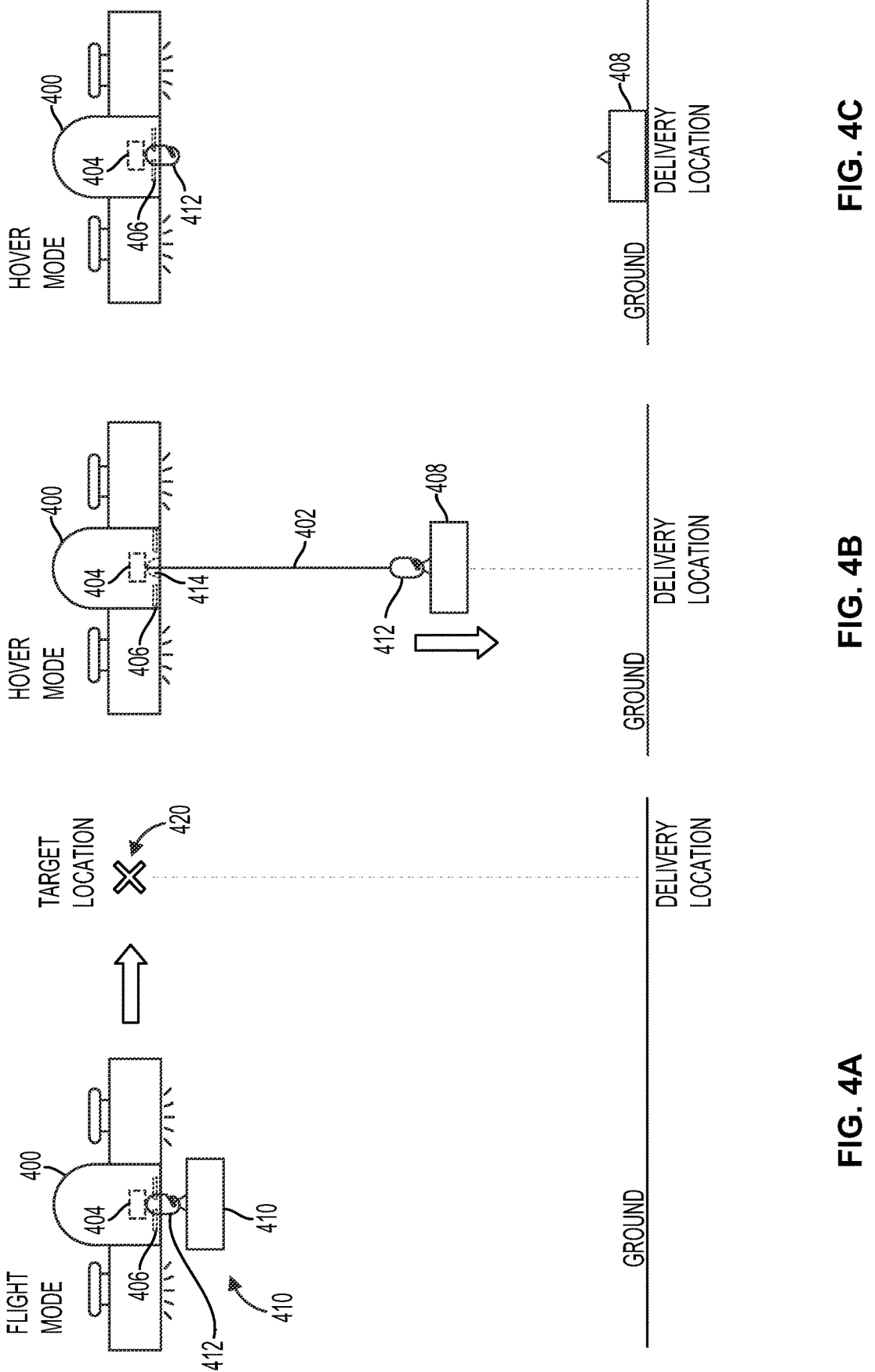
FIGS. 4A, 4B, and 4C show a payload delivery apparatus, according to example embodiments.

FIGS. 4A, 4B, and 4C show a UAV 400 that includes a payload delivery system 410 (which could also be referred to as a payload delivery apparatus), according to an example embodiment. As shown, payload delivery system 410 for UAV 400 includes a tether 402 coupled to a spool 404, a payload latch 406, and a payload 408 coupled to the tether 402 via a payload coupling apparatus 412. The payload latch 406 can function to alternately secure payload 408 and release the payload 408 upon delivery. For instance, as shown, the payload latch 406 may take the form of one or more pins that can engage the payload coupling apparatus 412 (e.g., by sliding into one or more receiving slots in the payload coupling apparatus 412). Inserting the pins of the payload latch 406 into the payload coupling apparatus 412 may secure the payload coupling apparatus 412 within a receptacle 414 on the underside of the UAV 400, thereby preventing the payload 408 from being lowered from the UAV 400. In some embodiments, the payload latch 406 may be arranged to engage the spool 404 or the payload 408 rather than the payload coupling apparatus 412 in order to prevent the payload 408 from lowering. In other embodiments, the UAV 400 may not include the payload latch 406, and the payload delivery apparatus may be coupled directly to the UAV 400.

In some embodiments, the spool 404 can function to unwind the tether 402 such that the payload 408 can be lowered to the ground with the tether 402 and the payload coupling apparatus 412 from UAV 400. The payload 408 may itself be an item for delivery, and may be housed within (or otherwise incorporate) a parcel, container, or other structure that is configured to interface with the payload latch 406. In practice, the payload delivery system 410 of UAV 400 may function to autonomously lower payload 408 to the ground in a controlled manner to facilitate delivery of the payload 408 on the ground while the UAV 400 hovers above.

As shown in FIG. 4A, the payload latch 406 may be in a closed position (e.g., pins engaging the payload coupling apparatus 412) to hold the payload 408 against or close to the bottom of the UAV 400, or even partially or completely inside the UAV 400, during flight from a launch site to a target location 420. The target location 420 may be a point in space directly above a desired delivery location. Then, when the UAV 400 reaches the target location 420, the UAV's control system (e.g., the tether control module 216 of FIG. 2) may toggle the payload latch 406 to an open position (e.g., disengaging the pins from the payload coupling apparatus 412), thereby allowing the payload 408 to be lowered from the UAV 400. The control system may further operate the spool 404 (e.g., by controlling the motor 222 of FIG. 2) such that the payload 408, secured to the tether 402 by a payload coupling apparatus 412, is lowered to the ground, as shown in FIG. 4B.

Once the payload 408 reaches the ground, the control system may continue operating the spool 404 to lower the tether 402, causing over-run of the tether 402. During over-run of the tether 402, the payload coupling apparatus 412 may continue to lower as the payload 408 remains stationary on the ground. The downward momentum and/or gravitational forces on the payload coupling apparatus 412 may cause the payload 408 to detach from the payload coupling apparatus 412 (e.g., by sliding off a hook of the payload coupling apparatus 412). After releasing payload 408, the control system may operate the spool 404 to retract the tether 402 and the payload coupling apparatus 412 toward the UAV 400. Once the payload coupling apparatus reaches or nears the UAV 400, the control system may operate the spool 404 to pull the payload coupling apparatus 412 into the receptacle 414, and the control system may toggle the payload latch 406 to the closed position, as shown in FIG. 4C.

In some embodiments, when lowering the payload 408 from the UAV 400, the control system may detect when the payload 408 and/or the payload coupling apparatus 412 has been lowered to be at or near the ground based on an unwound length of the tether 402 from the spool 404. Similar techniques may be used to determine when the payload coupling apparatus 412 is at or near the UAV 400 when retracting the tether 402. As noted above, the UAV 400 may include an encoder for providing data indicative of the rotation of the spool 404. Based on data from the encoder, the control system may determine how many rotations the spool 404 has undergone and, based on the number of rotations, determine a length of the tether 402 that is unwound from the spool 404. For instance, the control system may determine an unwound length of the tether 402 by multiplying the number of rotations of the spool 404 by the circumference of the tether 402 wrapped around the spool 404. In some embodiments, such as when the spool 404 is narrow or when the tether 402 has a large diameter, the circumference of the tether 402 on the spool 404 may vary as the tether 402 winds or unwinds from the tether, and so the control system may be configured to account for these variations when determining the unwound tether length.

In other embodiments, the control system may use various types of data, and various techniques, to determine when the payload 408 and/or payload coupling apparatus 412 have lowered to be at or near the ground. Further, the data that is used to determine when the payload 408 is at or near the ground may be provided by sensors on UAV 400, sensors on the payload coupling apparatus 412, and/or other data sources that provide data to the control system.

In some embodiments, the control system itself may be situated on the payload coupling apparatus 412 and/or on the UAV 400. For example, the payload coupling apparatus 412 may include logic module(s) implemented via hardware, software, and/or firmware that cause the UAV 400 to function as described herein, and the UAV 400 may include logic module(s) that communicate with the payload coupling apparatus 412 to cause the UAV 400 to perform functions described herein.

Figure 5A:
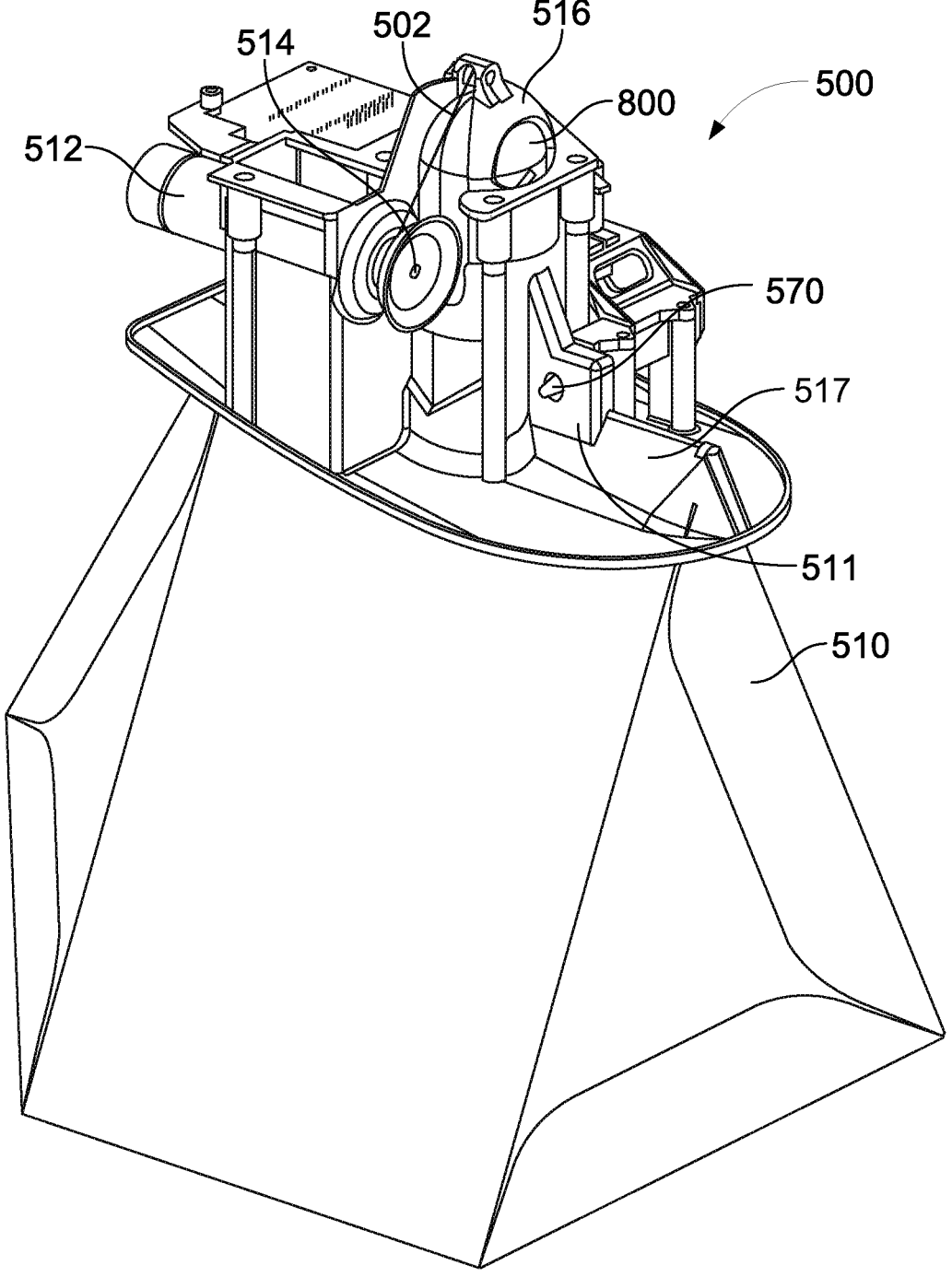
FIG. 5A is a perspective view of a payload delivery apparatus 500 including payload 510, according to an example embodiment.

FIG. 5A shows a perspective view of a payload delivery apparatus 500 including payload 510, according to an example embodiment. The payload delivery apparatus 500 is positioned within a fuselage of a UAV (not shown) and includes a winch 514 powered by motor 512, and a tether 502 spooled onto winch 514. The tether 502 is attached to a payload coupling apparatus or payload retriever 800 positioned within a payload coupling apparatus receptacle 516 positioned within the fuselage of the UAV (not shown). A payload 510 is secured to the payload coupling apparatus 800. In this embodiment a top portion 517 of payload 510 is secured within the fuselage of the UAV. A locking pin 570 is shown extending through handle 511 attached to payload 510 to positively secure the payload beneath the UAV during high speed flight.

Figure 5B:
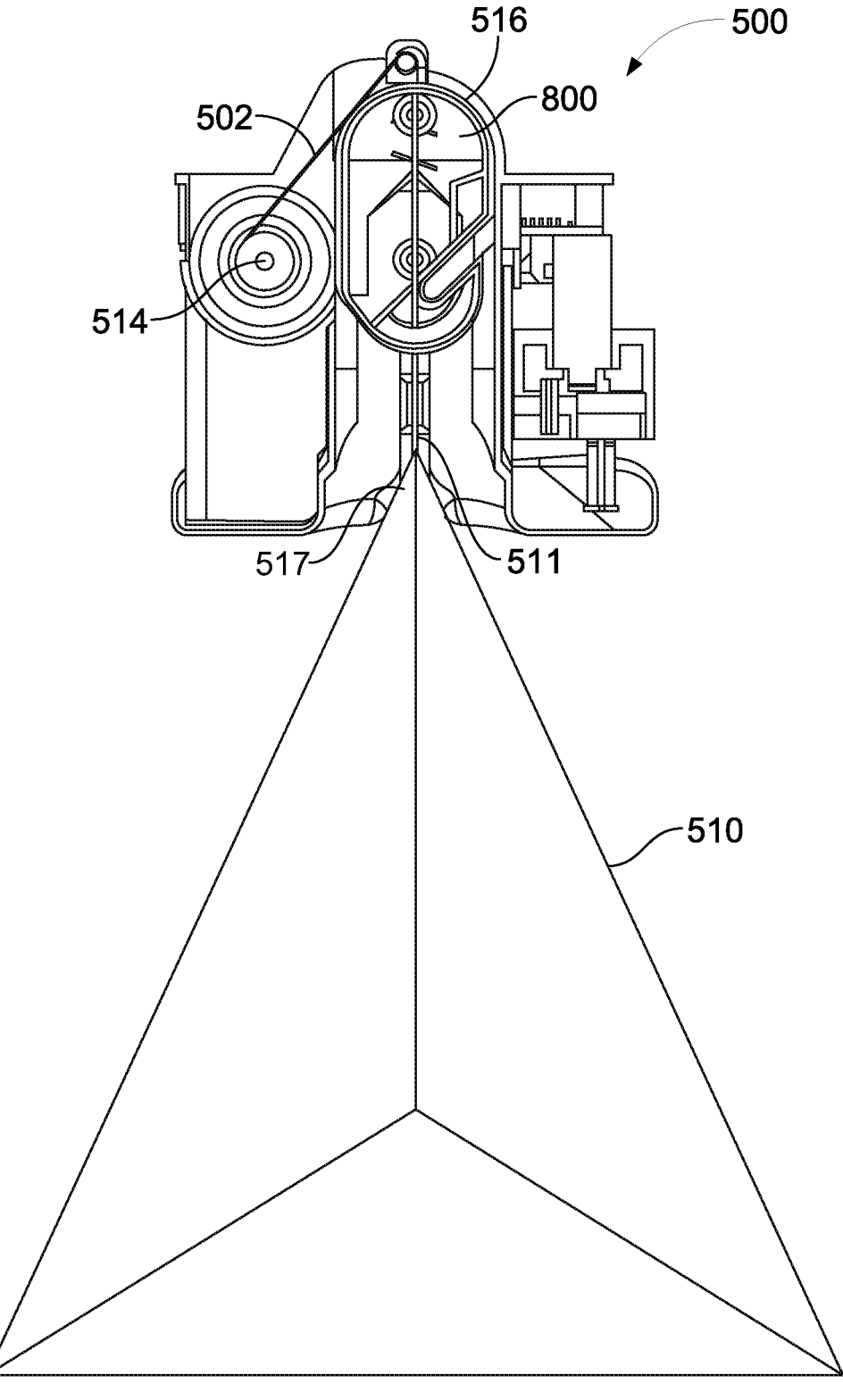
FIG. 5B is a cross-sectional side view of payload delivery apparatus 500 and payload 510 shown in FIG. 5A.

FIG. 5B is a cross-sectional side view of payload delivery apparatus 500 and payload 510 shown in FIG. 5A. In this view, the payload coupling apparatus is shown tightly positioned with the payload coupling apparatus receptacle 516. Tether 502 extends from winch 514 and is attached to the top of payload coupling apparatus 800. Top portion 517 of payload 510 is shown positioned within the fuselage of the UAV (not shown) along with handle 511.

Figure 5C:
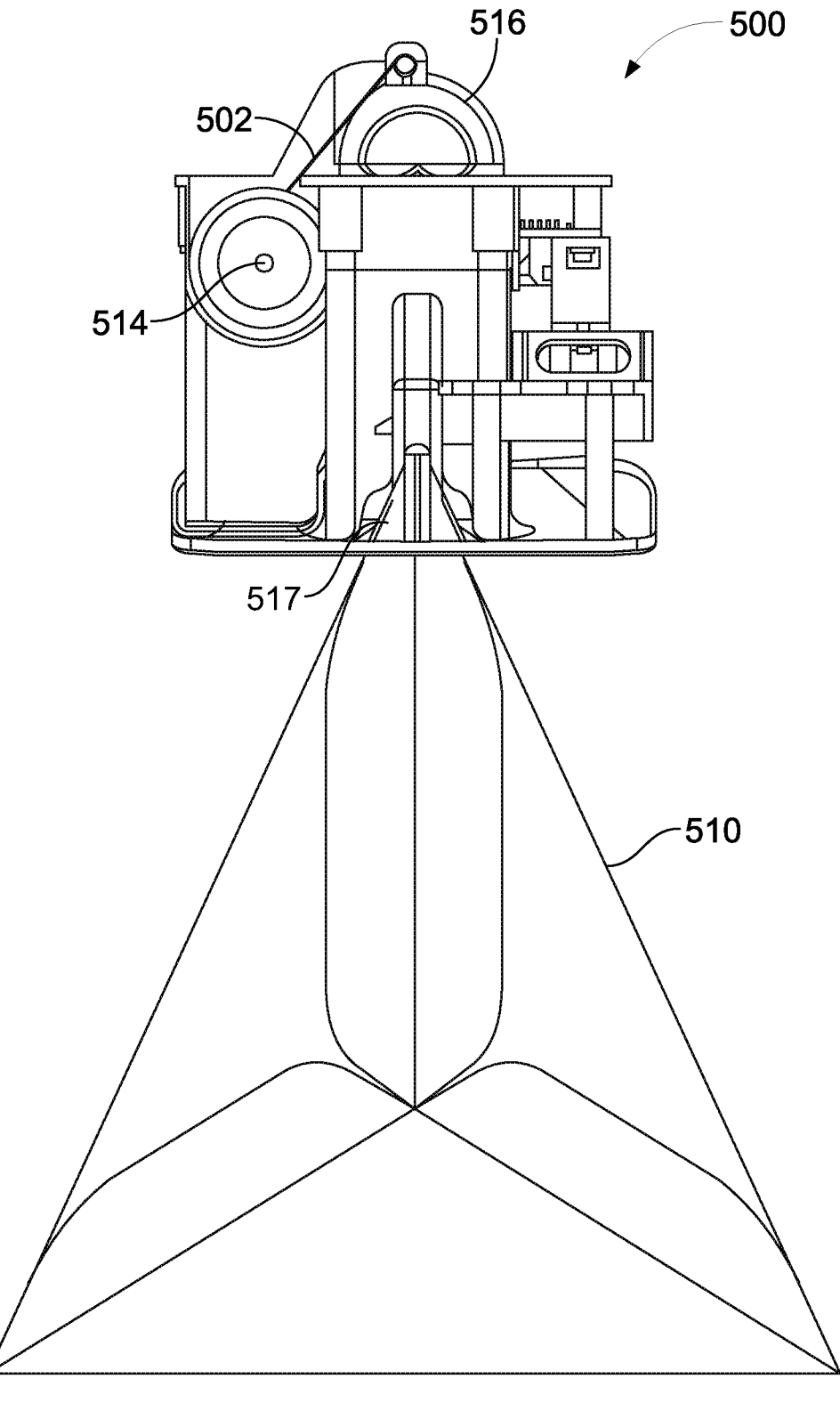
FIG. 5C is a side view of payload delivery apparatus 500 and payload 510 shown in FIGS. 5A and 5B.

FIG. 5C is a side view of payload delivery apparatus 500 and payload 510 shown in FIGS. 5A and 5B. The top portion 517 of payload 510 is shown positioned within the fuselage of the UAV. Winch 514 has been used to wind in tether 502 to position the payload coupling apparatus within payload coupling apparatus receptacle 516. FIGS. 5A-C disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape.

Figures 6A, 6B, 6C:
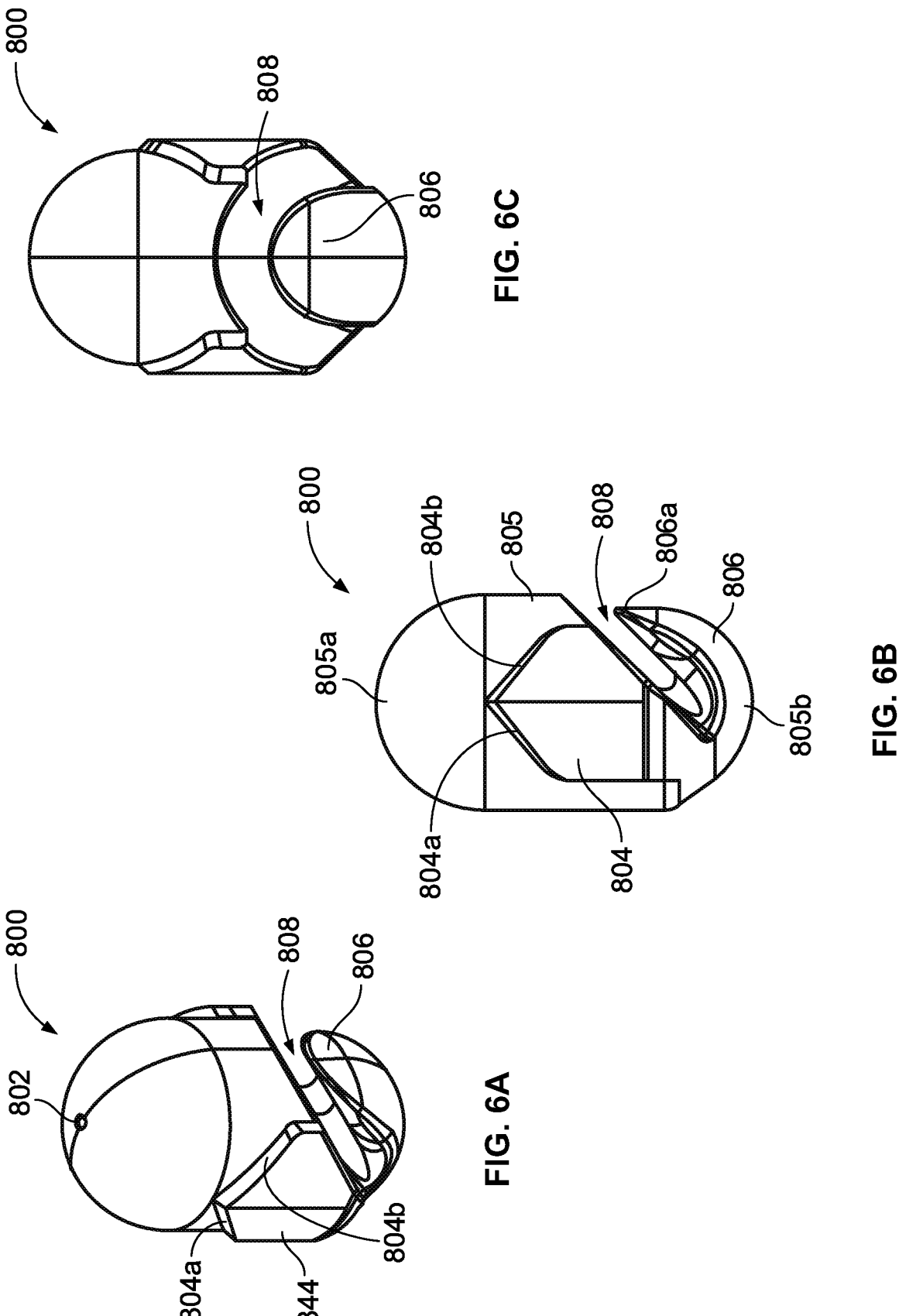
FIG. 6A is a perspective view of payload coupling apparatus 800, according to an example embodiment.
FIG. 6B is a side view of payload coupling apparatus 800 shown in FIG. 6A.
FIG. 6C is a front view of payload coupling apparatus 800 shown in FIGS. 6A and 6B.

FIG. 6A is a perspective view of payload coupling apparatus 800, according to an example embodiment. Payload coupling apparatus 800 includes tether mounting point 802, and a slot 808 to position a handle of a payload handle in. Lower lip, or hook, 806 is positioned beneath slot 808. Also included is an outer protrusion 804 having helical cam surfaces 804a and 804b that are adapted to mate with corresponding cam mating surfaces within a payload coupling apparatus receptacle positioned with a fuselage of a UAV.

FIG. 6B is a side view of payload coupling apparatus 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the payload after it has been decoupled, or will not get engaged with power lines or tree branches during retrieval to the UAV.

FIG. 6C is a front view of payload coupling apparatus 800 shown in FIGS. 6A and 6B. Lower lip or hook 806 is shown positioned beneath slot 808 that is adapted for securing a handle of a payload.

Figures 7, 8:
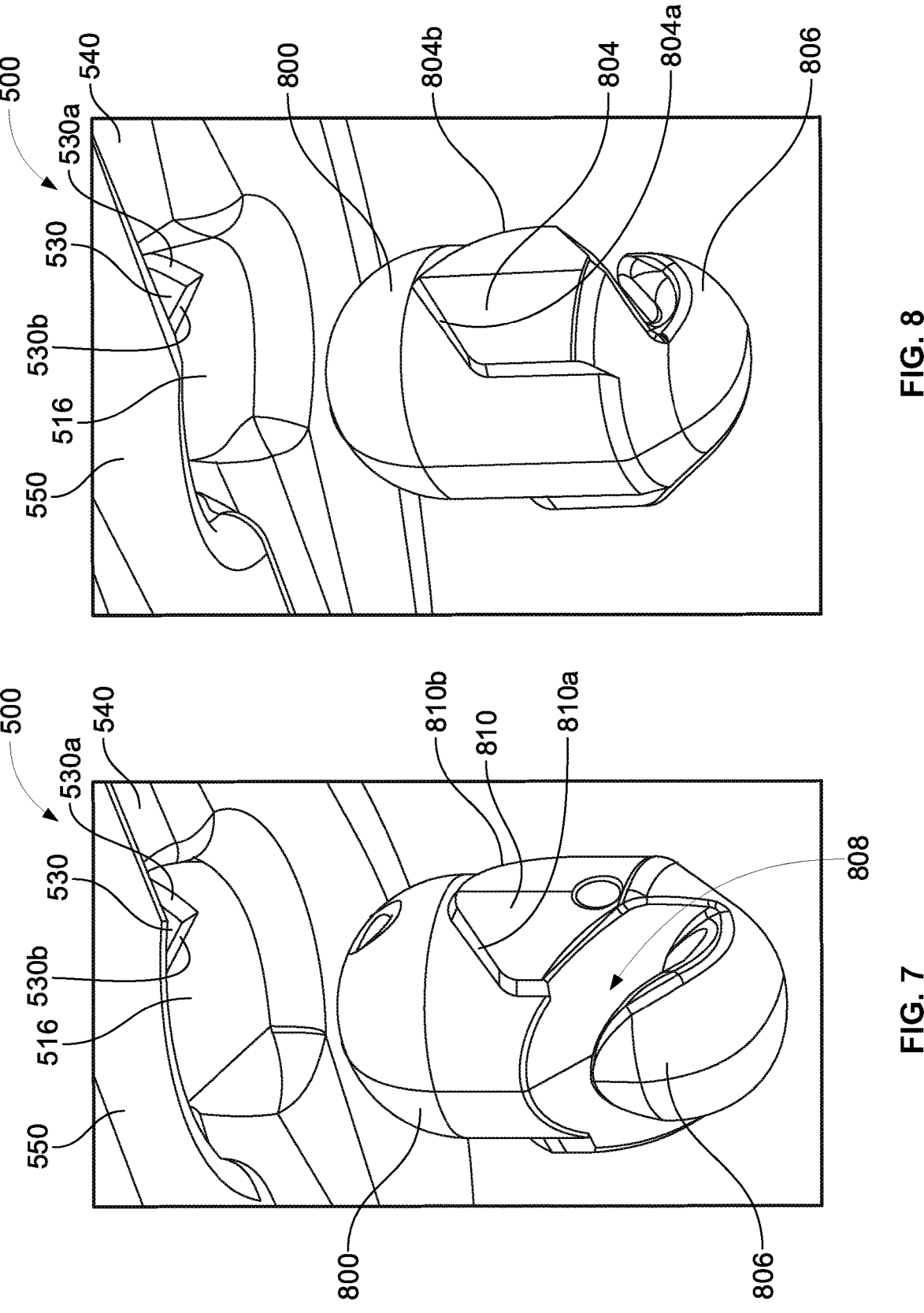
FIG. 7 is a perspective view of payload coupling apparatus 800 shown in FIGS. 6A-6C, prior to insertion into a payload coupling apparatus receptacle positioned in the fuselage of a UAV.
FIG. 8 is another perspective view of payload coupling apparatus 800 shown in FIGS. 6A-6C, prior to insertion into a payload coupling apparatus receptacle positioned in the fuselage of a UAV.

FIG. 7 is a perspective view of payload coupling apparatus 800 shown in FIGS. 6A-6C, prior to insertion into a payload coupling apparatus receptacle 516 positioned in the fuselage 550 of a UAV. As noted previously payload coupling apparatus 800 includes a slot 808 positioned above lower lip or hook 806, adapted to receive a handle of a payload. The fuselage 550 of the payload delivery system 500 includes a payload coupling apparatus receptacle 516 positioned within the fuselage 550 of the UAV. The payload coupling apparatus 800 includes an outer protrusion 810 have helical cammed surfaces 810a and 810b that meet in a rounded apex. The helical cammed surfaces 810a and 810b are adapted to mate with surfaces 530a and 530b of an inward protrusion 530 positioned within the payload coupling apparatus receptacle 516 positioned within fuselage 550 of the UAV. Also included is a longitudinal recessed restraint slot 540 positioned within the fuselage 550 of the UAV that is adapted to receive and restrain a top portion of a payload (not shown). As the payload coupling apparatus 800 is pulled into to the payload coupling apparatus receptacle 516, the cammed surfaces 810a and 810b of outer protrusion 810 engage with the cammed surfaces 530a and 530b within the payload coupling apparatus receptacle 516 and the payload coupling apparatus 800 is rotated into a desired alignment within the fuselage 550 of the UAV.

FIG. 8 is another perspective view of an opposite side of payload coupling apparatus 800 shown in FIGS. 6A-6C, prior to insertion into a payload coupling apparatus receptacle 516 positioned in the fuselage 550 of a UAV. As shown, payload coupling apparatus 800 include a lower lip or hook 806. An outer protrusion 804 is shown extending outwardly from the payload coupling apparatus having helical cammed surfaces 804a and 804b adapted to engage and mate with cammed surfaces 530a and 530b of inner protrusion 530 positioned within payload coupling apparatus receptacle 516 positioned within fuselage 550 of payload delivery system 500. It should be noted that the cammed surfaces 804a and 804b meet at a sharp apex, which is asymmetrical with the rounded or blunt apex of cammed surfaces 810a and 810b shown in FIG. 7. In this manner, the rounded or blunt apex of cammed surfaces 810a and 810b prevent possible jamming of the payload coupling apparatus 800 as the cammed surfaces engage the cammed surfaces 530a and 530b positioned within the payload coupling apparatus receptacle 516 positioned within fuselage 550 of the UAV. In particular, cammed surfaces 804a and 804b are positioned slightly higher than the rounded or blunt apex of cammed surfaces 810a and 810b. As a result, the sharper tip of cammed surfaces 804a and 804b engages the cammed surfaces 530a and 530b within the payload coupling apparatus receptacle 516 positioned within the fuselage 550 of payload delivery system 500, thereby initiating rotation of the payload coupling apparatus 800 slightly before the rounded or blunt apex of cammed surfaces 810a and 810b engage the corresponding cammed surfaces within the payload coupling apparatus receptacle 516. In this manner, the case where both apexes (or tips) of the cammed surfaces on the payload coupling apparatus end up on the same side of the receiving cams within the payload coupling apparatus receptacle is prevented. This scenario results in a prevention of the jamming of the payload coupling apparatus within the receptacle.

Figure 9:
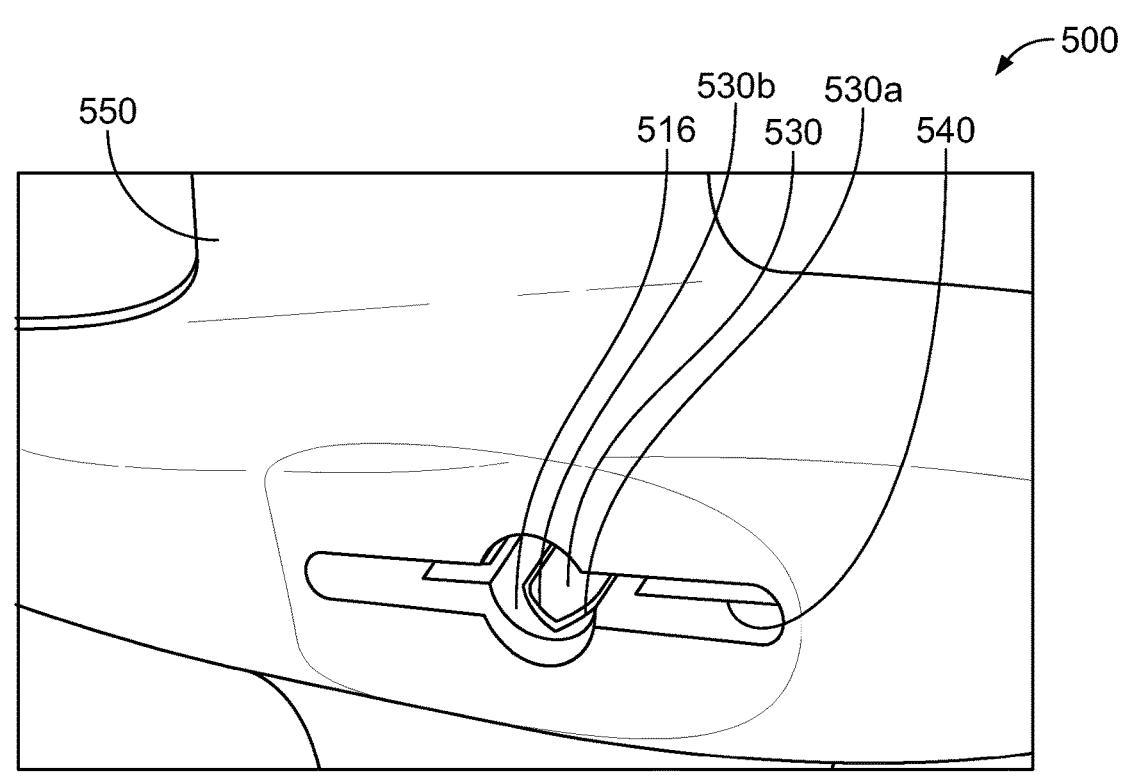
FIG. 9 shows a perspective view of a recessed restraint slot and payload coupling apparatus receptacle positioned in a fuselage of a UAV.

FIG. 9 shows a perspective view of a recessed restraint slot and payload coupling apparatus receptacle positioned in a fuselage of a UAV. In particular, payload delivery system 500 includes a fuselage 550 having a payload coupling apparatus receptacle 516 therein that includes inward protrusion 530 having cammed surfaces 530a and 530b that are adapted to mate with corresponding cammed surfaces on a payload coupling apparatus (not shown). Also included is a longitudinally extending recessed restrained slot 540 into which a top portion of a payload is adapted to be positioned and secured within the fuselage 550.

Figure 10A:
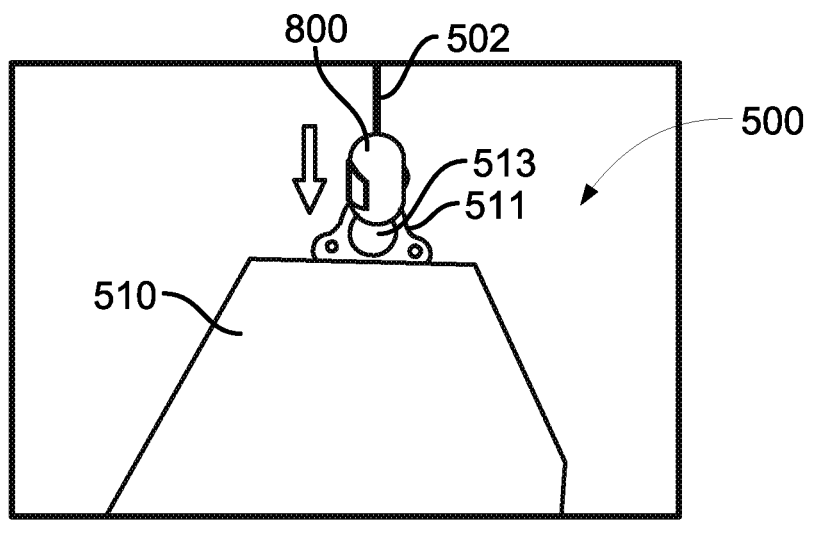
FIG. 10A shows a side view of a payload delivery apparatus 500 with a handle 511 of payload 510 secured within a payload coupling apparatus 800 as the payload 510 moves downwardly prior to touching down for delivery.

FIG. 10A shows a side view of a payload delivery apparatus 500 with a handle 511 of payload 510 secured within a payload coupling apparatus 800 as the payload 510 moves downwardly prior to touching down for delivery. Prior to payload touchdown, the handle 511 of payload 510 includes a hole 513 through which a lower lip or hook of payload coupling apparatus 800 extends. The handle sits within a slot of the payload coupling apparatus 800 that is suspended from tether 502 of payload delivery system 500 during descent of the payload 510 to a landing site.

Figure 10B:
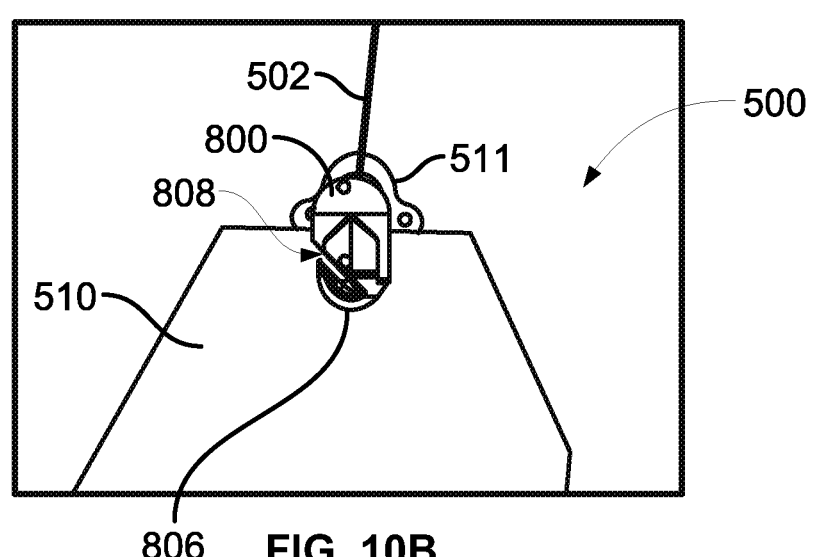
FIG. 10B shows a side view of payload delivery apparatus 500 after payload 510 has landed on the ground showing payload coupling apparatus 800 decoupled from handle 511 of payload 510.

FIG. 10B shows a side view of payload delivery apparatus 500 after payload 510 has landed on the ground showing payload coupling apparatus 800 decoupled from handle 511 of payload 510. Once the payload 510 touches the ground, the payload coupling apparatus 800 continues to move downwardly (as the winch further unwinds) through inertia or gravity and decouples the lower lip or hook 808 of the payload coupling apparatus 800 from handle 511 of payload 510. The payload coupling apparatus 800 remains suspended from tether 502, and can be winched back up to the payload coupling receptacle of the UAV.

Figure 10C:
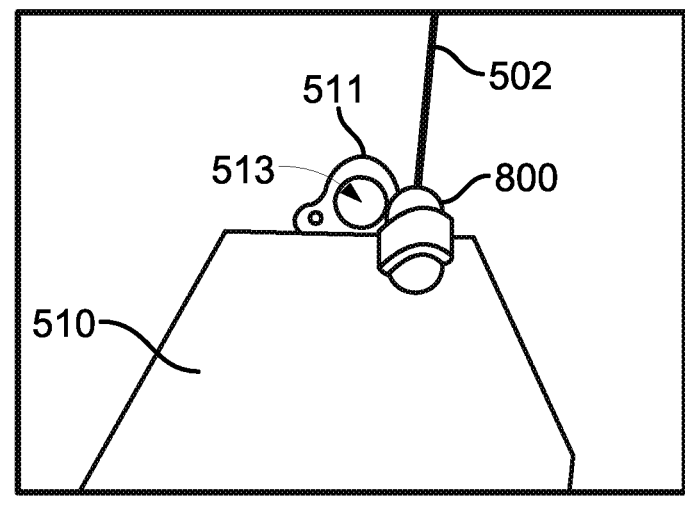
FIG. 10C shows a side view of payload delivery apparatus 500 with payload coupling apparatus 800 moving away from handle 511 of payload 510.

FIG. 10C shows a side view of payload delivery apparatus 500 with payload coupling apparatus 800 moving away from handle 511 of payload 510. Here the payload coupling apparatus 800 is completely separated from the hole 513 of handle 511 of payload 510. Tether 502 may be used to winch the payload coupling apparatus back to the payload coupling apparatus receptacle positioned in the fuselage of the UAV.

Figure 11A:
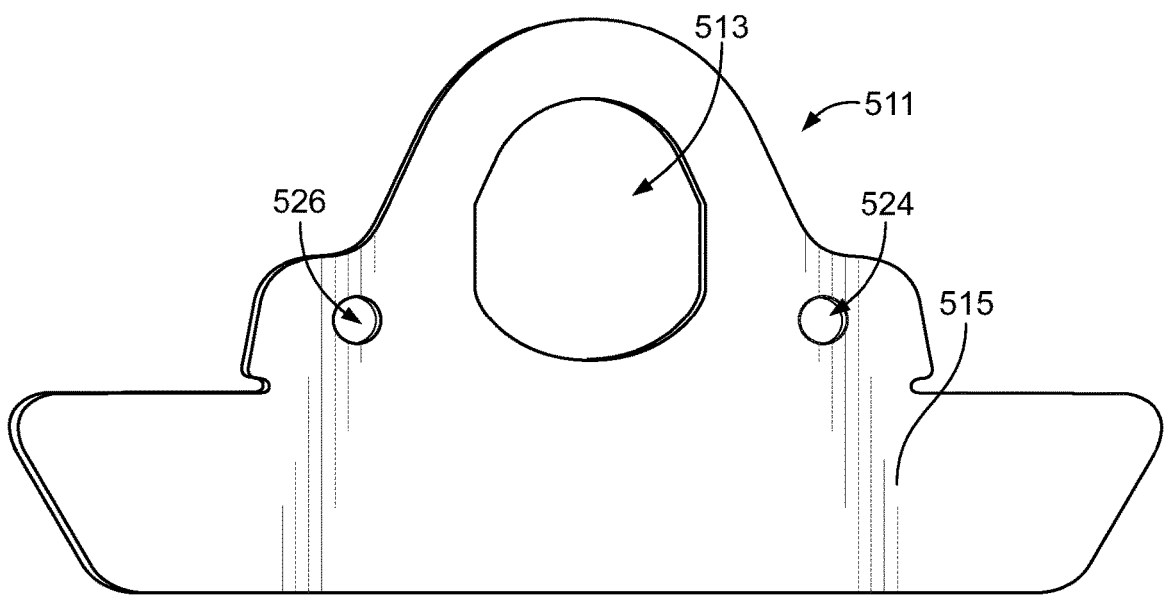
FIG. 11A is a side view of handle 511 of payload 510 having openings 514 and 516 adapted to receive pins positioned on a payload holder, according to an example embodiment.

FIG. 11A is a side view of handle 511 of payload 510. The handle 511 includes an aperture 513 through which the lower lip or hook of a payload coupling apparatus extends through to suspend the payload during delivery, or for retrieval. The handle 511 includes a lower portion 515 that is secured to the top portion of a payload. Also included are holes 524 and 526 through which locking pins positioned within the fuselage of a UAV, may extend to secure the handle and payload in a secure position during high speed forward flight to a delivery location. In addition, holes 524 and 526 are also designed for pins of a payload holder to extend therethrough to hold the payload in position for retrieval on a payload retrieval apparatus. The handle may be comprised of a thin, flexible plastic material that is flexible and provides sufficient strength to suspend the payload beneath a UAV during forward flight to a delivery site, and during delivery and/or retrieval of a payload. In practice, the handle may be bent to position the handle within a slot of a payload coupling apparatus. The handle 511 also has sufficient strength to withstand the torque during rotation of the payload coupling apparatus into the desired orientation within the payload coupling apparatus receptacle, and rotation of the top portion of the payload into position with the recessed restraint slot.

Figure 11B:
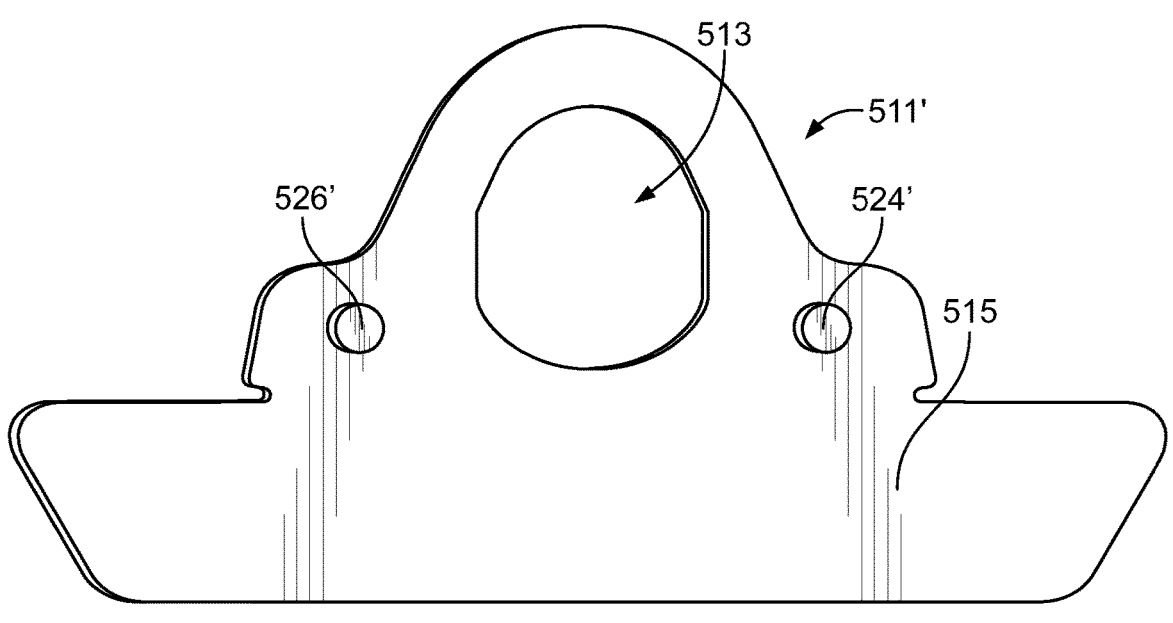
FIG. 11B is a side view of handle 511' of a payload having magnets 514' and 516' positioned thereon for magnetic engagement with a payload holder, according to an example embodiment.

FIG. 11B is a side view of handle 511' of payload 510. The handle 511' includes an aperture 513 through which the lower lip or hook of a payload coupling apparatus extends through to suspend the payload during delivery, or for retrieval. The handle 511' includes a lower portion 515 that is secured to the top portion of a payload. Also included are magnets 524' and 526' adapted for magnetic engagement with corresponding magnets (or a metal) of a payload holder to secure the payload to the payload holder in position for retrieval on a payload retrieval apparatus. In some examples, magnets 524' and 526' are provided on a handle (e.g., handle 511 or 511') in place of holes 524 and 526. In other examples, magnets 524' and 526' are provided in addition to holes 524 and 526.

Figure 12:
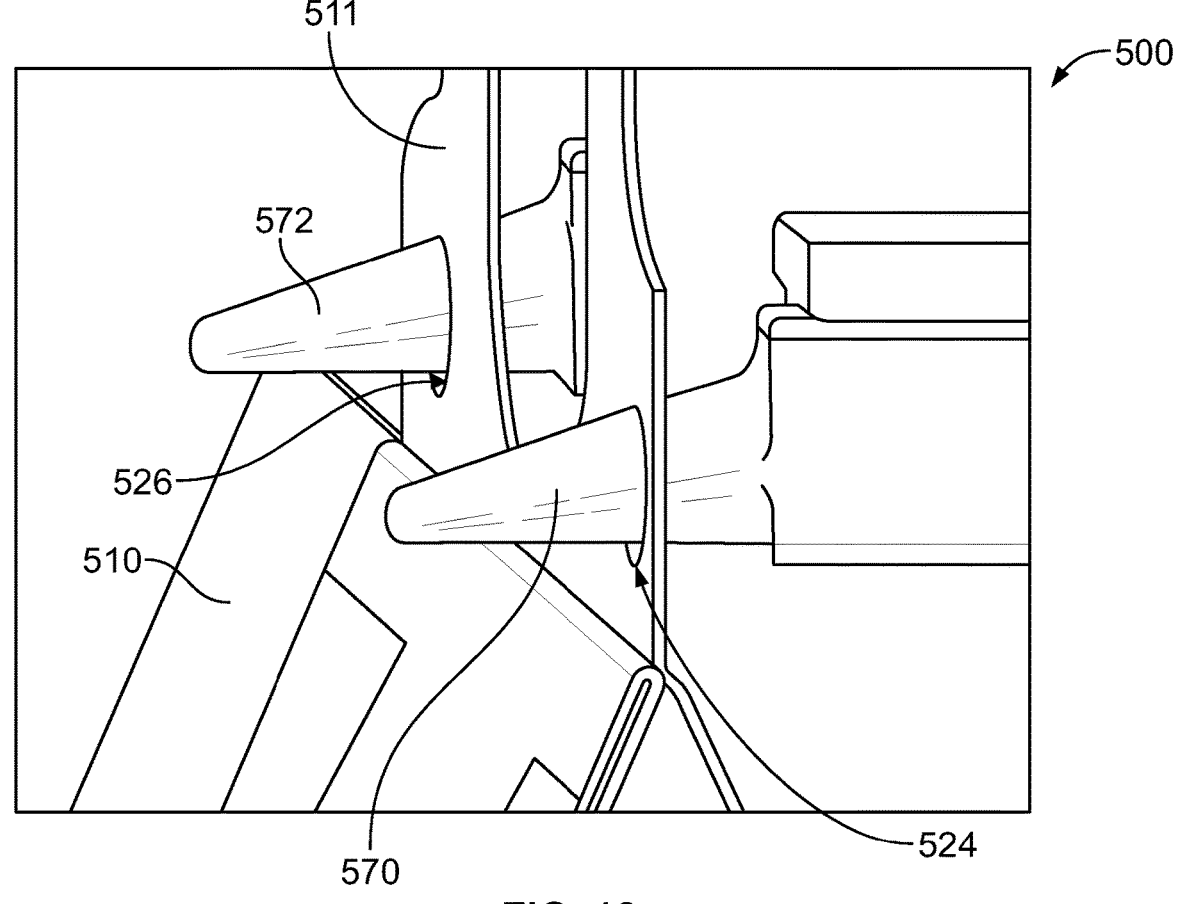
FIG. 12 shows a pair of locking pins 570, 572 extending through holes 514 and 516 in handle 511 of payload 510 to secure the handle 511 and top of payload 510 within the fuselage of a UAV, or to secure the handle 511 to a payload holder on a payload retrieval apparatus.

FIG. 12 shows a pair of pins 570, 572 extending through holes 524 and 526 in handle 511 of payload 510 to secure the handle 511 and top portion of payload 510 within the fuselage of a UAV, or to secure payload 510 to a payload holder of a payload retrieval apparatus. In this manner, the handle 511 and payload 510 may be secured within the fuselage of a UAV, or to a payload holder of a payload retrieval apparatus. In this embodiment, the pins 570 and 572 have a conical shape so that they pull the package up slightly or at least remove any downward slack present. In some embodiments the pins 570 and 572 may completely plug the holes 524 and 526 of the handle 511 of payload 510, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

Figure 13A:
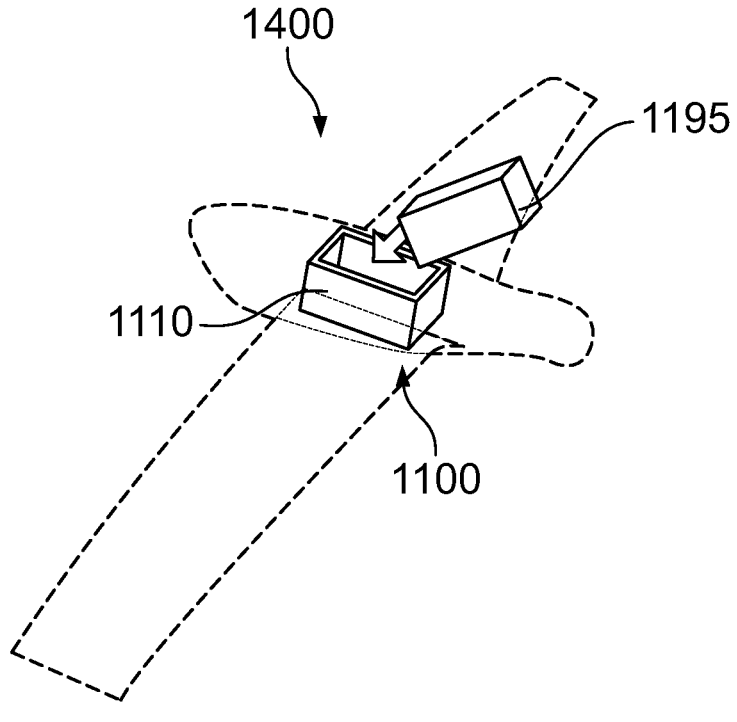
FIG. 13A is a perspective top view of UAV 1400 having cargo bay 1100 illustrating payload 1195 being loaded into cargo bay 1100.
Figure 13B:
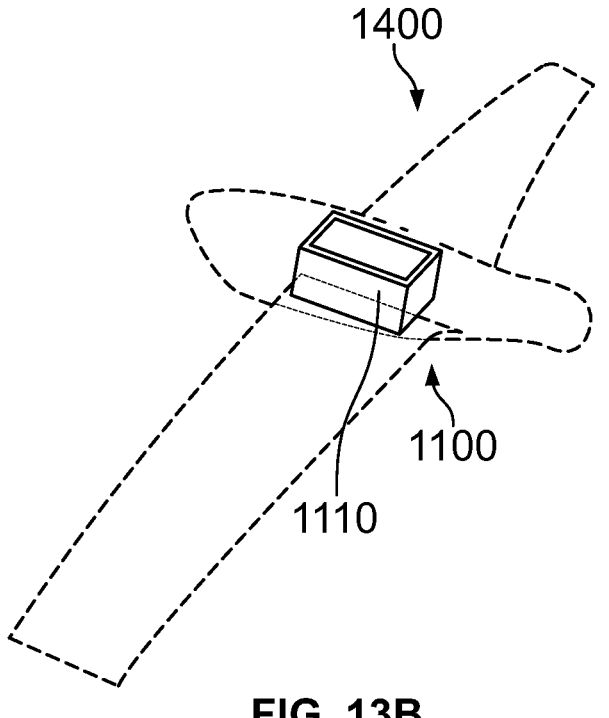
FIG. 13B is another perspective top view of UAV 1400 with payload 1195 positioned in cargo bay 1110 during flight.
Figure 13C:
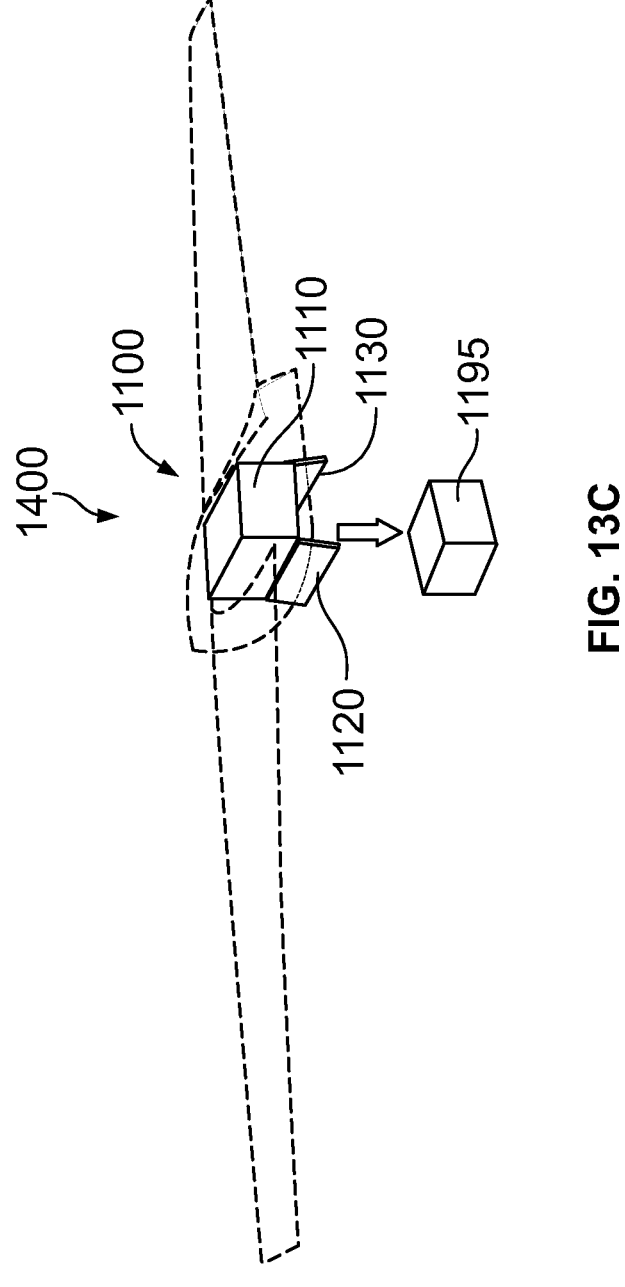
FIG. 13C is a perspective view of UAV 1400 illustrating payload 1195 being dropped from cargo bay 1100.

FIG. 13A is a perspective top view of UAV 1400 having cargo bay 1100 illustrating payload 1195 being loaded into cargo bay 1100; FIG. 13B is another perspective top view of UAV 1400 with payload 1195 positioned in cargo bay housing 1110 during flight; and FIG. 13C is a perspective view of UAV 1400 illustrating payload 1195 being dropped from cargo bay 1100.

Payload 1195 is illustrated being positioned into cargo bay housing 1110 in cargo bay 1100 of UAV 1400 in FIG. 13A. In this embodiment, the payload 1195 is loaded into cargo bay 1110 through a top of the UAV 1400. However, in other embodiments, the payload 1195 could be loaded through the bottom, a side, or even the front or rear, of the fuselage body of the UAV 1400. In FIG. 13B, UAV 1400 is shown during forward flight transporting payload 1195 within cargo bay housing 1110 of cargo bay 1100. In FIG. 13C, payload 1195 is shown being dropped through open doors 1120 and 1130 of cargo bay housing 1110 of cargo bay 1100 and exiting UAV 1400 for delivery.

Figure 14A:
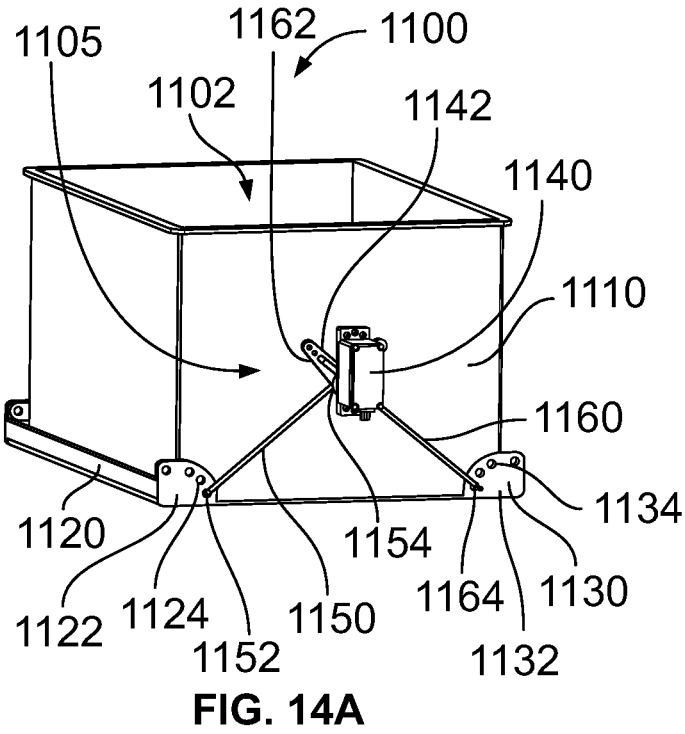
FIG. 14A is a perspective view of cargo bay 1100 with lower cargo bay doors 1120 and 1130 in a closed position.

FIG. 14A is a perspective view of cargo bay 1100 with lower cargo bay doors 1120 and 1130 of cargo bay housing 1100 in a closed position. Cavity 1102 is positioned in cargo bay 1100 and is adapted to contain a payload. A linkage assembly 1105 is positioned on the cargo bay housing 1100. In the embodiment shown in FIG. 14A, the linkage assembly 1105 is shown on a cargo bay housing. However, in many embodiments, the UAV 1400 (shown in FIGS. 13A-C) may not include a cargo bay housing. Instead, for example, the linkage assembly 1105 may be positioned on or within the fuselage body of the UAV 1400. Lower cargo bay doors 1120 and 1130 are shown attached to the cargo bay housing 1100. However, lower cargo bay doors 1120 and 1130 could simply be attached to the fuselage body itself, or attached to another component within the fuselage body of UAV 1400, and movable by actuator 1140 to open and close cargo bay doors 1120 and 1130.

The linkage assembly 1105 includes an actuator 1140 which is operable to rotate first horn 1144 and second horn 1142. A first linkage arm or member 1150 has a first end 1154 pivotally mounted to first horn 1144 and a second end 1152 pivotally mounted to a flange 1122 on an end of lower cargo bay door 1120. In the embodiment shown in FIGS. 14A-C, first end 1154 of first linkage member 1150 is pivotally mounted to first horn 1144 using a throughhole in first horn 1144, and the second end 1152 of first linkage member 1150 is pivotally mounted to flange 1122 on lower cargo bay door 1120 using a throughhole 1124 in flange 1122. Other methods aside from using throughholes may also be used to pivotally mount the ends of the first linkage member 1150 to lower cargo bay door 1120 and first horn 1144. As one example, the ends of first linkage member 1150 could be pinned to the lower cargo bay door 1120 and first horn 1144.

The linkage assembly 1105 also includes a second linkage arm or member 1160. Second linkage member 1160 has a first end 1162 pivotally mounted to second horn 1142 and a second end 1164 pivotally mounted to a flange 1132 on an end of lower cargo bay door 1130. First end 1162 of second linkage member 1160 is pivotally mounted to second horn 1142 using a throughhole in second horn 1142, and the second end 1164 of second linkage member 1160 is pivotally mounted to flange 1132 on lower cargo bay door 1130 using a throughhole 1134 in flange 1132. Other methods aside from using throughholes may also be used pivotally mount the ends of the second linkage member 1160 to lower cargo bay door 1130 and second horn 1142. As one example, the ends of second linkage member 1160 could be pinned to the lower cargo bay door 1130 and second horn 1142.

Actuator 1140 is operable to provide rotational movement of first horn 1144 and second horn 1142 which in turn move first and second linkage members 1150 and 1160 to open and close lower cargo bay doors 1120 and 1130. Actuator 1140 may be a servo motor. Alternatively, actuator 1140 may be any mechanism that can impart movement to the first and second linkage members 1150 and 1160, such as a rotary or linear actuator, a rotating gear, a rack and pinion mechanism, a hydraulic or pneumatic cylinder, and a rotary motor, as examples.

The use of first horn 1144 and second horn 1142 attached to actuator 1140 provides a number of advantages. In particular, when lower cargo bay doors 1120 and 1130 are in a closed position, as shown in FIG. 14A, the first linkage member 1150 is oriented so that the line extending from the joint at the first end 1154 to the joint at the second end 1152 passes through an area in the vicinity of the axis of the actuator 1140, e.g., within 1 cm of the axis. Accordingly, forces transmitted through the first linkage member 1150 to the first horn 1144 will act on the first horn 1144 substantially in a radial direction and will not exert significant torque on the actuator 1140. As a result, undue forces or undesirable moments of force on the actuator 1140 may be avoided. The second linkage member 1160 is similarly oriented so that the line extending from the joint at the first end 1162 to the joint at the second end 1164 passes through an area in the vicinity of the axis of the actuator 1140, such that forces transmitted through the second linkage member 1160 to the second horn 1142 will act on the second horn 1142 substantially in a radial direction and will also not exert significant torque on the actuator 1140. Similarly, when the door is in a fully open position, the forces acting through the first and second horns 1144 and 1142 extend through the actuator 1140 which is beneficial as wind loads on the cargo bay door will not cause the cargo bay door to close and impede delivery of the payload. Further, by using two horns, a force exerted by the first linkage member 1150 on first horn 1144 and actuator 1140 may be equalized by the force exerted by the second linkage member 1160 on second horn 1142 and actuator 1140. Advantageously, with this configuration loading on the actuator 1140 that would cause the lower cargo bay doors 1120 and 1130 to open may be avoided.

Figure 14B:
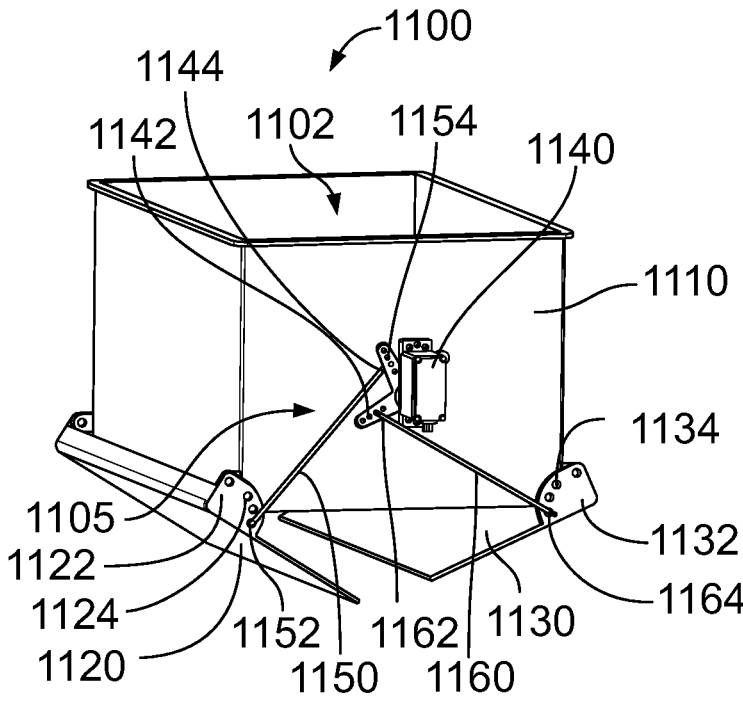
FIG. 14B is a perspective side view of cargo bay 1100 with lower cargo bay doors 1120 and 1130 in a partially open position.
Figure 14C:
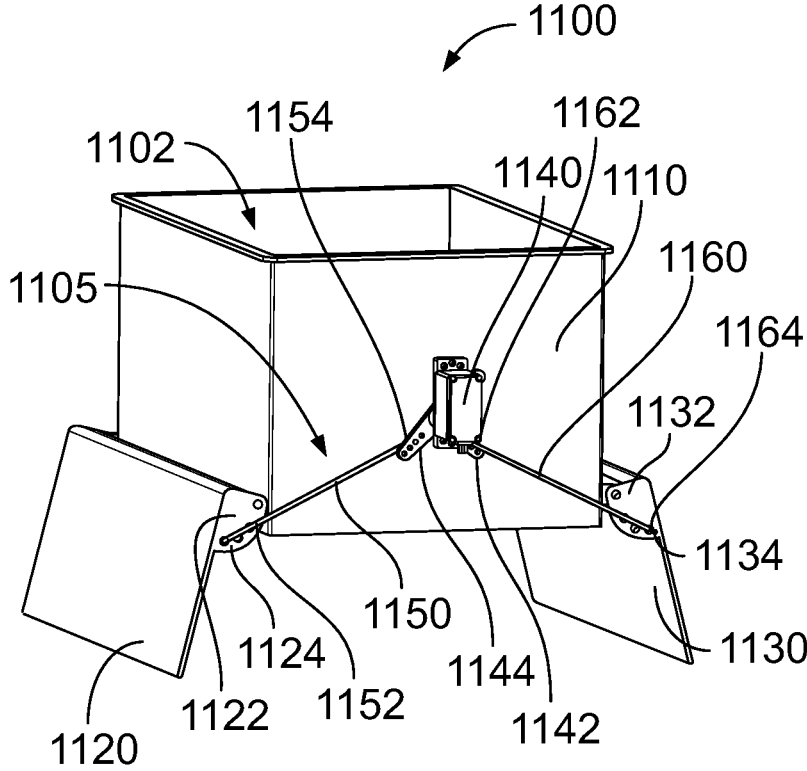
FIG. 14C is a perspective side view of cargo bay 1100 with lower cargo bay doors 1120 and 1130 in an open position.

In FIGS. 14A-C, two lower cargo bay doors 1120 and 1130 are used. However, only a single lower cargo bay door could also be used. FIG. 14B is a perspective side view of cargo bay 1100 with lower cargo bay doors 1120 and 1130 in a partially open position. FIG. 14C is a perspective side view of cargo bay 1100 with lower cargo bay doors 1120 and 1130 in an open position, which allows for a payload within the cargo bay 1100 to be dropped from the cargo bay 1100 to provide for the delivery of the payload at a desired delivery site.

Figure 19A:
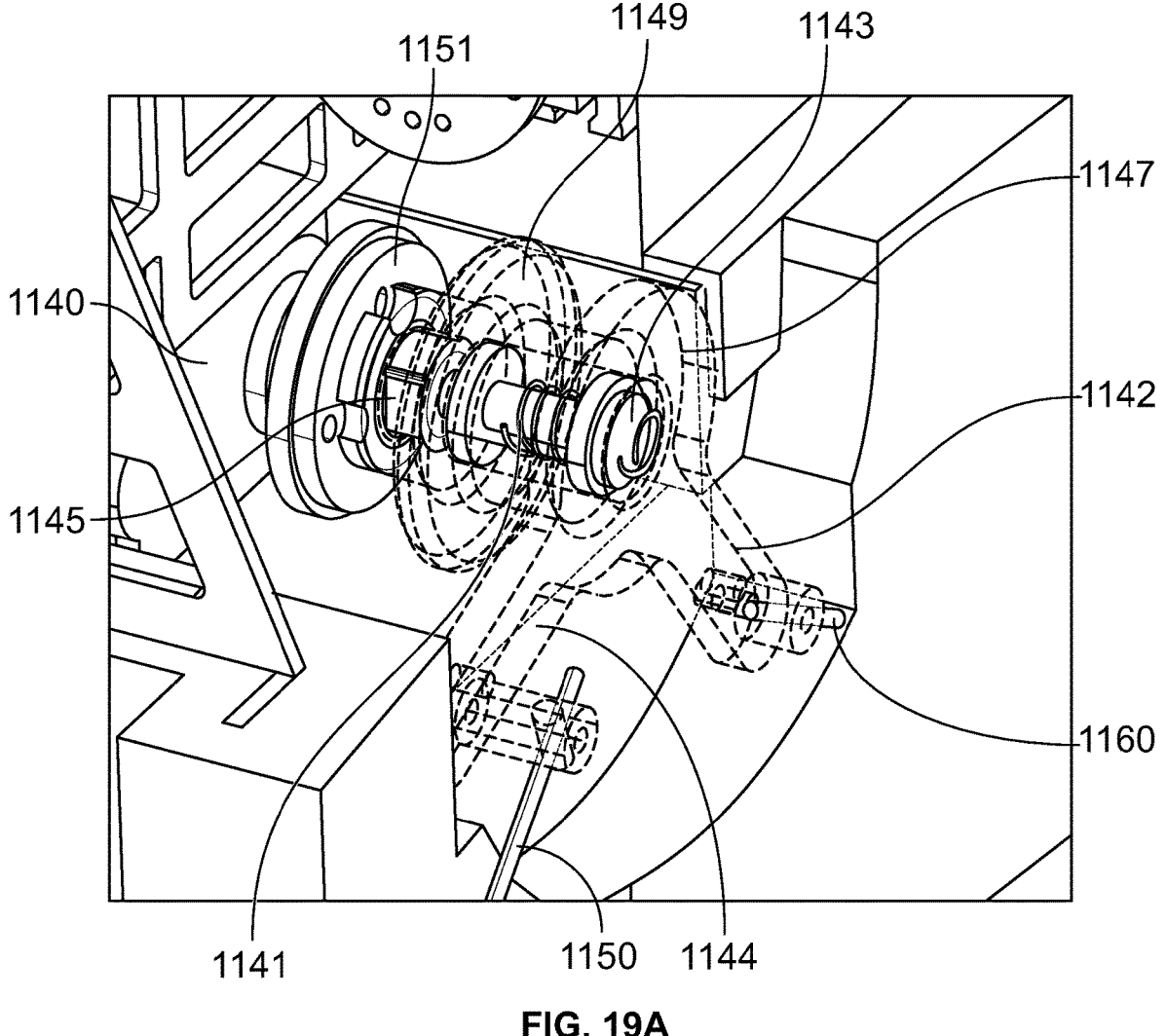
FIG. 19A is a perspective view of actuator 1140 and attachment 1147 with first horn 1144 and second horn 1142.

FIG. 19A is a detailed perspective view of actuator 1140 shown in FIGS. 14A-14C. Actuator 1140 includes a rotatable output shaft 1143. An attachment 1147 is positioned about rotatable output shaft 1143 and is movable relative to rotatable output shaft 1143. Attachment 1147 includes the first horn 1144 pivotally attached to linkage arm 1150 and the second horn 1142 pivotally attached to linkage arm 1160. Linkage arms 1150 and 1160 are operable to open and/or close lower cargo bay doors 1120 and 1130 shown in FIGS. 14A-14C. Rotatable output shaft 1143 includes a key 1145 (shown in FIG. 19A as a flat surface, although other key configurations could also be used) that serves to prevent rotation of attachment 1147 about rotatable output shaft 1143. A compression spring 1141 (shown as a coil spring in FIG. 19A) is positioned between attachment 1147 and shoulder 1149 to bias the attachment 1147 into a keyed position with key (flat surface) 1145 on rotatable output shaft 1143.

Figure 19B:
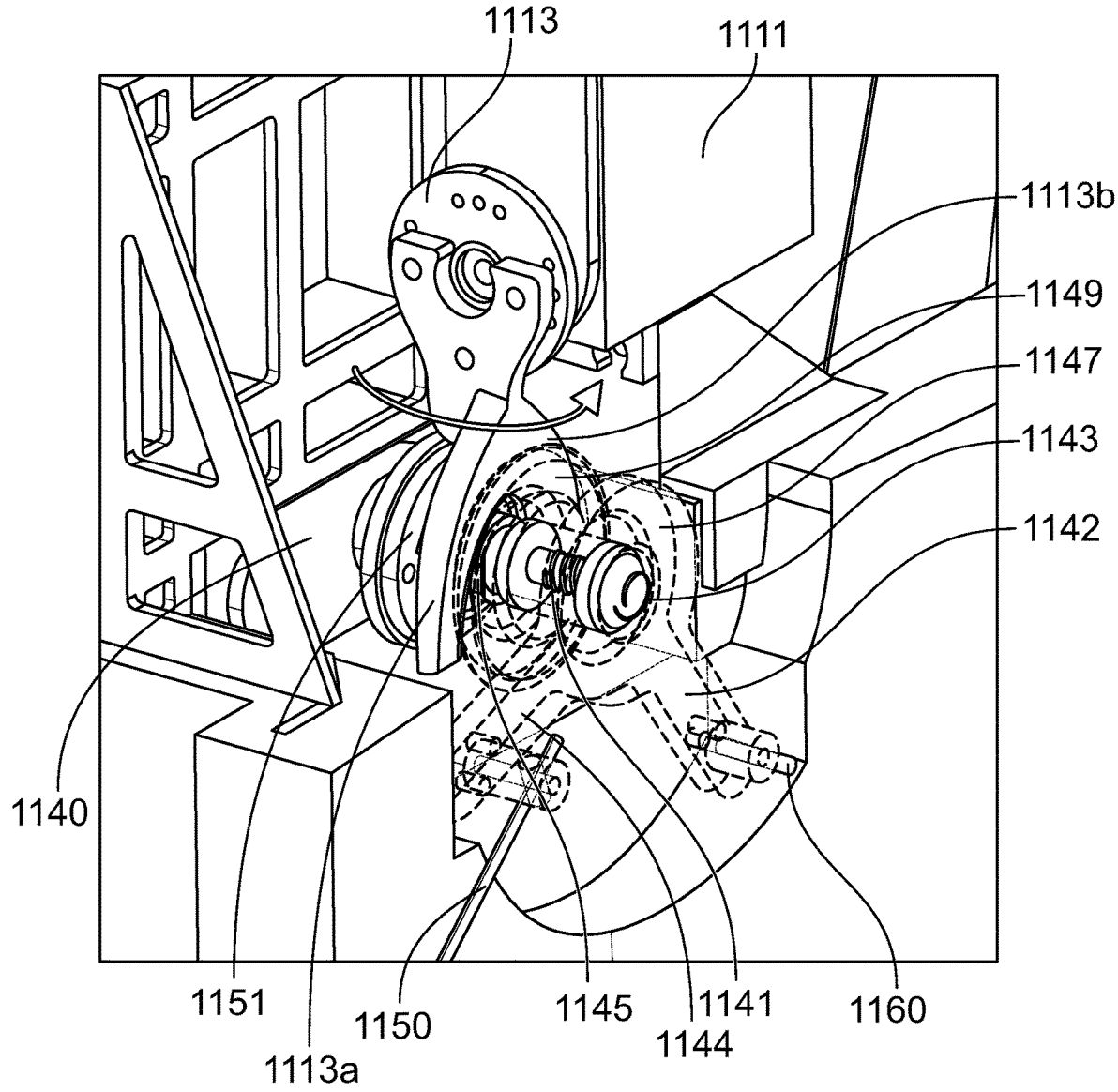
FIG. 19B is a perspective view of actuator 1140 and auxiliary actuator 1111 having a pair of arms 1113a and 1113b adapted to disengage attachment 1147 from actuator 1140.

FIG. 19B is a perspective view of actuator 1140 and auxiliary actuator 1111 having a pair of arms 1113a and 1113b that extend around rotatable output shaft 1143 and abut shoulder 1149. In the event of a failure of actuator 1140 with the lower cargo bay doors 1120 and 1130 in an open or partially open position, the auxiliary actuator 1111 is operable to rotate and cause the pair of arms 1113a and 1113b to push against shoulder 1149 and compress compression spring 1141 to move the attachment 1147 out of the keyed position with rotatable output shaft 1143. Once attachment 1147 is out of the keyed position, lower cargo bay doors 1120 and 1130, which may be spring-loaded or counterweighted to a closed position, snap into a closed position, thereby preventing any drag that would be caused by having the lower cargo bay doors 1120 and 1130 during flight. The use of an auxiliary actuator may also be used in the same manner when there is only a single lower cargo bay door. As described above, the lower cargo bay door(s) is biased to a closed position, and the auxiliary actuator 1111 is configured to decouple the lower cargo bay door from the (main) actuator 1140, thereby allowing the lower cargo bay door(s) to close.

A method of using cargo bay 1100 includes (i) providing a UAV having a fuselage body including a cavity that forms a cargo bay for transporting a payload, and a lower access opening providing an exit for the payload from the cargo bay, the lower access opening including a lower cargo bay door, an actuator positioned in the fuselage body, a linkage assembly connected to the actuator and connected to the lower cargo bay door, wherein the actuator and linkage assembly are operable to open and/or close the lower cargo bay door, wherein a first horn is mounted to the actuator; and wherein the linkage assembly includes a first linkage member having a first end and a second end, the first end of the first linkage member pivotally attached to the first horn and the second end of the first linkage member pivotally attached to the cargo bay door; (ii) positioning a payload into the cargo bay; (iii) moving the UAV to a payload delivery site; (iv) operating the actuator to cause the linkage assembly to open the lower cargo bay door; and (v) dropping the payload from the cargo bay at the delivery site.

Figure 15A:
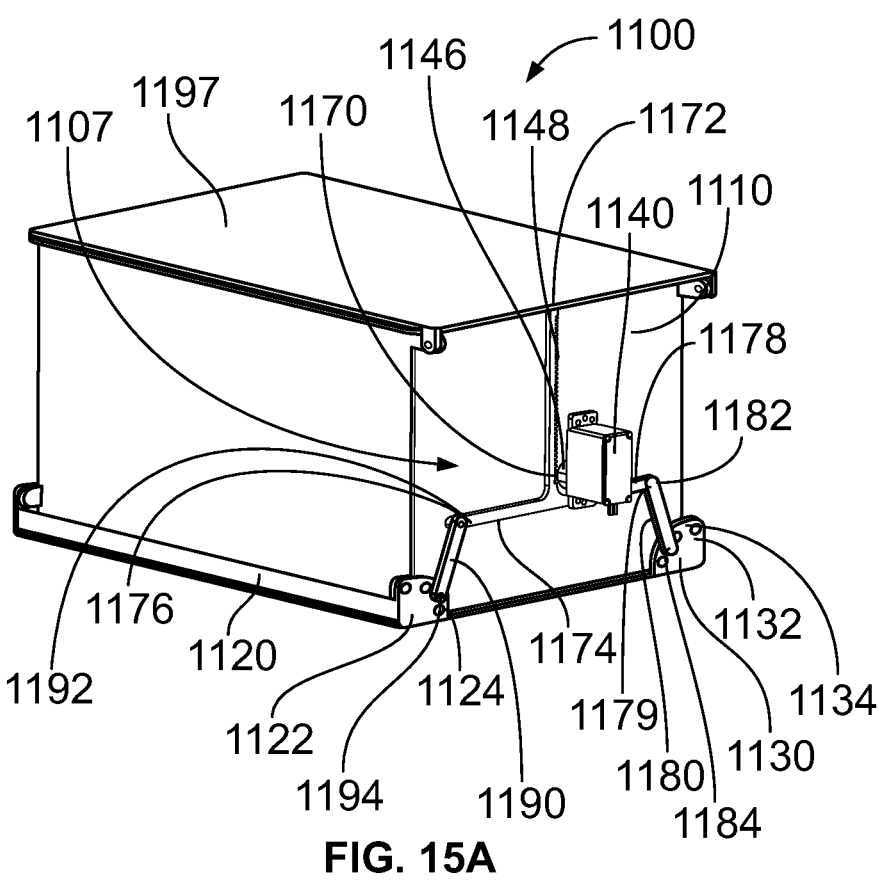
FIG. 15A is a perspective side view of cargo bay 1100 with lower cargo bay doors 1120 and 1130 in a closed position.

FIG. 15A is a perspective side view of cargo bay 1100 with a cargo bay housing 1110 having lower cargo bay doors 1120 and 1130 in a closed position. A linkage assembly 1107 is positioned on the cargo bay housing 1100. In the embodiment shown in FIG. 15A, the linkage assembly 1105 is shown on a cargo bay housing. However, in many embodiments, the UAV 1400 (shown in FIGS. 13A-C) may not include a cargo bay housing. Instead, the linkage assembly 1107 may be positioned on or within the fuselage body of the UAV 1400. Lower cargo bay doors 1120 and 1130 are shown attached to the cargo bay housing 1100. However, lower cargo bay doors 1120 and 1130 could simply be attached to the fuselage body itself, or attached to another component within the fuselage body of UAV 1400, and movable by actuator 1140 to open and close cargo bay doors 1120 and 1130.

The linkage assembly 1107 includes an actuator 1140 which is operable to move linkage assembly 1107 up and down to open and close the lower cargo bay doors 1120 and 1130. Linkage assembly 1107 includes an upwardly extending member 1170 that cooperates with the actuator 1140, and the linkage assembly 1107 also includes a lower extending member 1174 attached to the upwardly extending member 1170. The lower extending member 1174 has a first end 1176 pivotally attached to a first end 1192 of a first linkage arm 1190, and the first linkage arm 1190 has a second end 1194 pivotally attached to flange 1122 on the lower cargo bay door 1120. The second end 1194 of the first linkage arm 1190 is shown pivotally pinned in throughhole 1124 in flange 1122 of lower cargo bay door 1120. The lower extending member 1174 is shown with a linear geometry, although it could be curved and have other geometries as well.

Figure 15B:
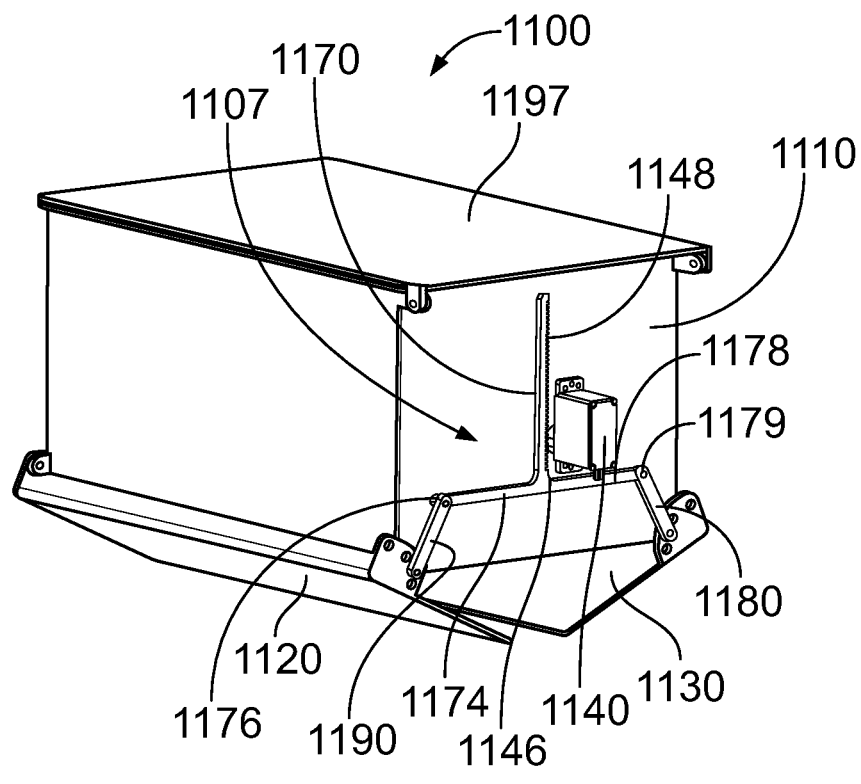
FIG. 15B is a perspective side view of cargo bay 1100 with lower cargo bay doors 1120 and 1130 in a partially open position.
Figure 15C:
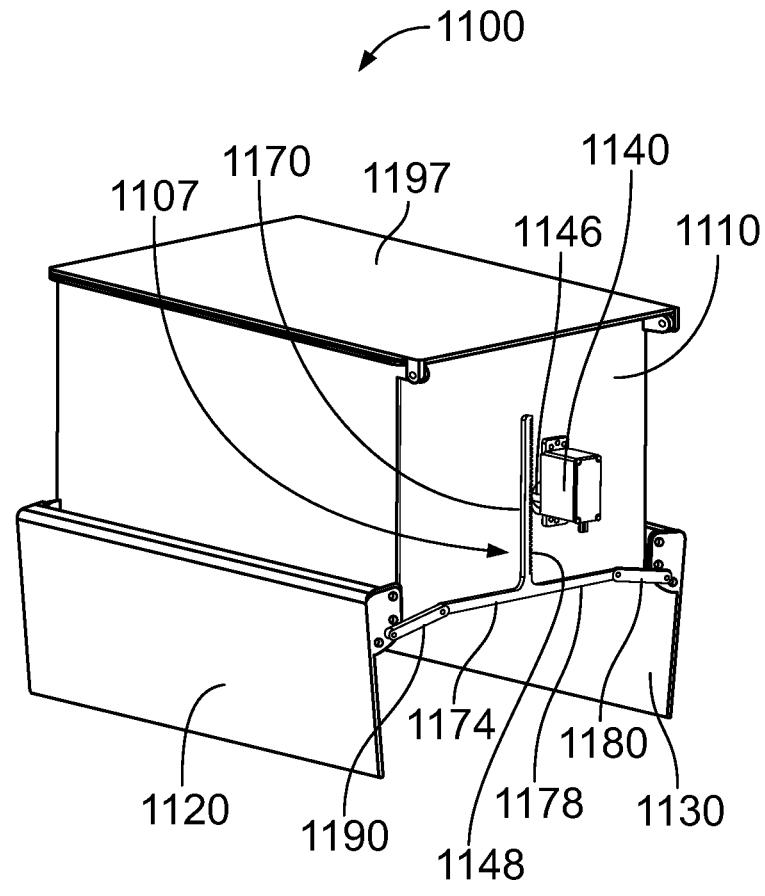
FIG. 15C is a perspective side view of cargo bay 1100 with lower cargo bay doors 1120 and 1130 in an open position.

As shown in FIGS. 15A-15C, the lower extending member 1174 also includes a second end 1179 pivotally attached to a first end 1182 of a second linkage arm 1180, and the second linkage arm 1180 has a second end 1184 pivotally attached to flange 1132 on the lower cargo bay door 1130. The second end 1184 of the second linkage arm 1180 is shown pivotally pinned in throughhole 1134 in flange 1132 of lower cargo bay door 1130. While FIGS. 15A-15C show two lower cargo bay doors 1120 and 1130, in some embodiments a single lower cargo bay door may be used.

Actuator 1140 includes a rotatable geared pinion 1146 that cooperates with teeth on the upwardly extending member 1170 to provide relative up and down movement of the upwardly extending member 1170 of the linkage assembly 1107 to provide for opening and closing the lower cargo bay doors 1120 and 1130. As the upwardly extending member 1170 is moved downwardly by the rotatable geared pinion 1146 on actuator 1140, first linkage arm 1190 is moved to open lower cargo bay door 1120 and simultaneously second linkage arm 1180 is moved downwardly to open lower cargo bay door 1130. In addition, upwardly extending member 1170 is also upwardly movable to push open an upper access door 1197. Even a slight opening of the upper access door 1197 can provide a visual indication to a user that the cargo bay 1100 is ready for the loading of the payload into the cargo bay 1100. Upper access door 1197 is shown positioned on cargo bay housing 1110. However, upper access door 1197 could also simply be positioned in an upper portion of the fuselage body of UAV 1400.

Actuator 1140 is operable to provide rotational movement of rotatable geared pinion 1146, which cooperates with teeth on upwardly extending member 1170 to provide for relative up and down motion of the linkage assembly 1107 to open and close lower cargo bay doors 1120 and 1130. Actuator 1140 may be a servo motor. However, actuator 1140 may be any mechanism that can impart movement to the linkage assembly 1107, such as a rotary or linear actuator, a hydraulic or pneumatic cylinder, and a rotary motor, as examples.

FIG. 15B is a perspective side view of cargo bay 1100 with lower cargo bay doors 1120 and 1130 in a partially open position. FIG. 15C is a perspective side view of cargo bay 1100 with lower cargo bay doors 1120 and 1130 in an open position, which allows for a payload within the cargo bay 1100 to be dropped from the cargo bay 1100 to provide for the delivery of the payload at a desired delivery site.

A method of using the cargo bay 1100 includes (i) providing a UAV having a fuselage body including a cavity that forms a cargo bay for transporting a payload, and a lower access opening providing an exit for the payload from the cargo bay, the lower access opening including a lower cargo bay door, an actuator positioned in the fuselage body, a linkage assembly connected to the actuator and connected to the lower cargo bay door, wherein the actuator and linkage assembly are operable to open and/or close the lower cargo bay door; and wherein the linkage assembly includes an upwardly extending member that cooperates with the actuator, and the linkage assembly also includes a lower extending member attached to the upwardly extending member, the lower extending member having a first end pivotally attached to a first end of a first linkage arm; the first linkage arm having a second end pivotally attached to the lower cargo bay door; (ii) positioning a payload into the cargo bay; (iii) moving the UAV to a payload delivery site; (iv) operating the actuator to cause the linkage assembly to open the lower cargo bay door; and (v) dropping the payload from the cargo bay at the delivery site.

Figures 16A, 16B:
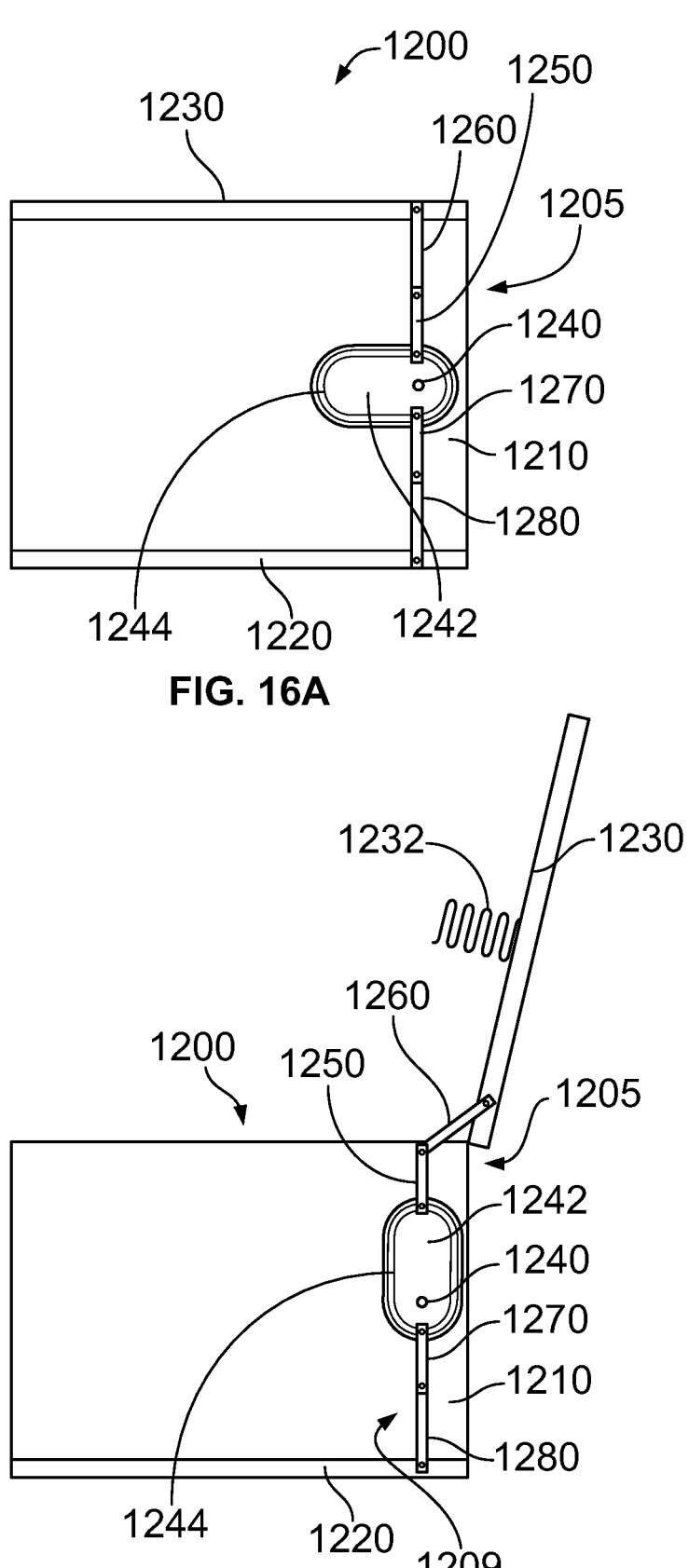
FIG. 16A is a perspective side view of cargo bay 1200 with upper cargo bay door 1230 and lower cargo bay door 1220 in a closed position.
FIG. 16B is a perspective side view of cargo bay 1200 with upper cargo bay door 1230 in an open position and lower cargo bay doors 1220 in a closed position.
Figure 16C:
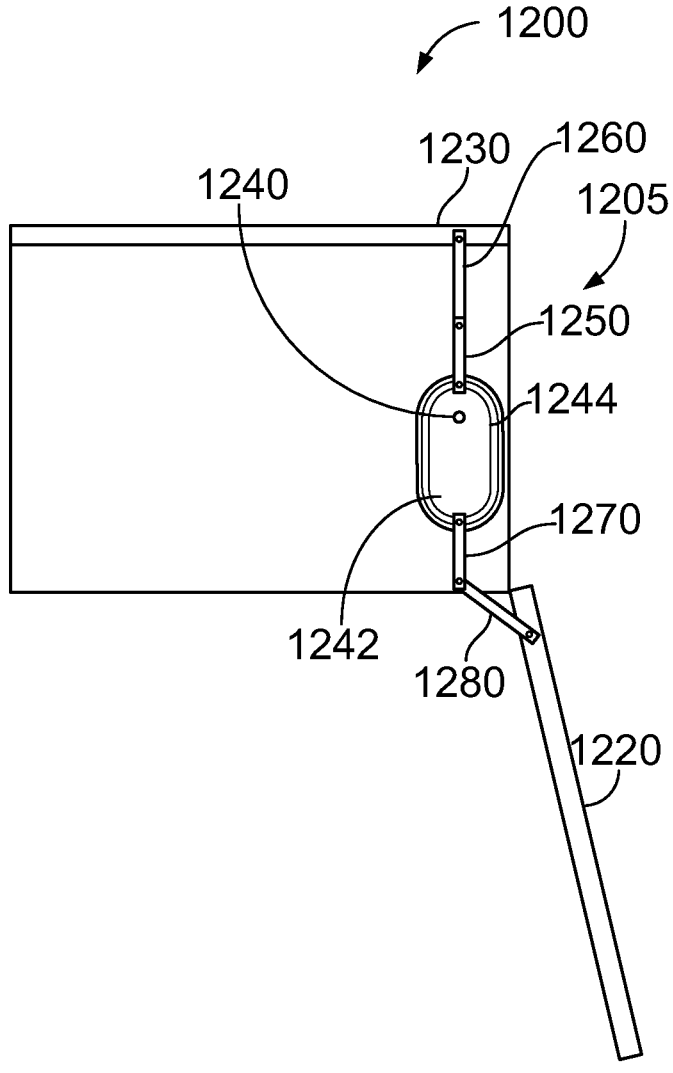
FIG. 16C is a perspective side view of cargo bay 1200 with upper cargo bay door 1230 in a closed position and lower cargo bay door 1220 in an open position.

FIGS. 16A-16C illustrate another cargo bay 1200 that may be used in UAV 1400 shown in FIGS. 13A-13C. FIG. 16A is a perspective side view of cargo bay 1200 with upper cargo bay door 1230 and lower cargo bay door 1220 in a closed position. Cargo bay doors 1230 and 1220 may be opened and closed using actuator 1240, cam 1242, first linkage assembly 1209, and second linkage assembly 1205.

First linkage assembly 1209 includes a first linkage arm 1270 having a first end movable by the cam 1242 and a second end pivotally mounted to a first end of a second linkage arm 1280, wherein a second end of the second linkage arm is pivotally mounted to the lower cargo bay door. The actuator 1240 is operable to rotate cam 1242 which moves first and second linkage arms 1270 and 1280 to open and close the lower cargo bay door 1220.

Second linkage assembly 1205 includes a third linkage arm 1250 having a first end movable by the cam 1242 and a second end pivotally mounted to a first end of a fourth linkage arm 1260, wherein a second end of the fourth linkage arm 1260 is pivotally mounted to the upper cargo bay door 1230. The actuator 1240 is operable to rotate cam 1242 which moves third and fourth linkage arms 1250 and 1260 to open and close the upper cargo bay door 1220.

In addition, cam 1242 includes a groove 1244 in which a first pin positioned on the first end of the first linkage arm 1270 rides when the cam 1242 is rotated by actuator 1240, and a second pin is positioned on a first end of the third linkage arm 1250 that rides in the groove 1244 when the cam 1242 is rotated by the actuator 1240. As shown in the embodiments of FIGS. 16A-16C, the groove 1244 has an oval shape, but could have other such such as a teardrop shape, and the groove 1244 extends around a periphery of the cam 1242.

With the configuration shown in FIGS. 16A-16C, a single actuator 1240 is operable to rotate cam 1242 to open and close both lower cargo bay door 1220 and upper cargo bay door 1230 independently. When the cam 1242 is rotated by the actuator 1240 to a first position, as shown in 16A, both the upper cargo bay door 1220 and the lower cargo bay door 1230 are closed. When the cam 1242 is rotated by the actuator to a second position, as shown in FIG. 16B, the upper cargo bay door 1220 is open and the lower cargo bay door 1230 is closed. When the cam 1242 is rotated by the actuator to a third position, as shown in FIG. 16C, the lower cargo bay door 1230 is open and the upper cargo bay door 1220 is closed.

As with actuator 1140 described above, actuator 1240 may be a servo motor. However, actuator 1240 may be any mechanism that can impart movement to the first and second linkage assemblies 1209 and 1205 to open and/or close cargo bay doors 1220 and 1230, such as a rotary or linear actuator, a rotating gear, a rack and pinion mechanism, a hydraulic or pneumatic cylinder, and a rotary motor, as examples.

In the embodiment shown in FIGS. 16A-16C, the first linkage assembly 1209, second linkage assembly 1205, and cam 1242 are shown positioned on cargo bay housing 1210. However, in many embodiments, the UAV 1400 (shown in FIGS. 13A-C) may not include a cargo bay housing. Instead, the first linkage assembly 1209, second linkage assembly 1205, and cam 1242 may be positioned on or within the fuselage body of the UAV 1400. Lower cargo bay door 1220 and upper cargo bay door 1230 are also shown attached to the cargo bay housing 1210. However, lower cargo bay door 1220 and upper cargo bay door 1230 could simply be attached to the fuselage body itself, or attached to another component within the fuselage body of UAV 1400, and movable by actuator 1240 and cam 1242 to open and close cargo bay doors 1220 and 1230.

FIG. 16B is a perspective side view of cargo bay 1200 with upper cargo bay door 1230 in an open position and lower cargo bay doors 1220 in a closed position. An underside of the upper cargo bay door 1230 includes a spring 1232 which contacts the payload when the payload is positioned in the cargo bay 1200, and a compression of the spring 1232 is measurable, e.g. through current sensing, to determine when the payload is positioned in the cargo bay 1200. FIG. 16C is a perspective side view of cargo bay 1200 with upper cargo bay door 1230 in a closed position and lower cargo bay door 1220 in an open position where the payload within cargo bay 1200 can be dropped at a delivery site.

Figures 17A, 17B:
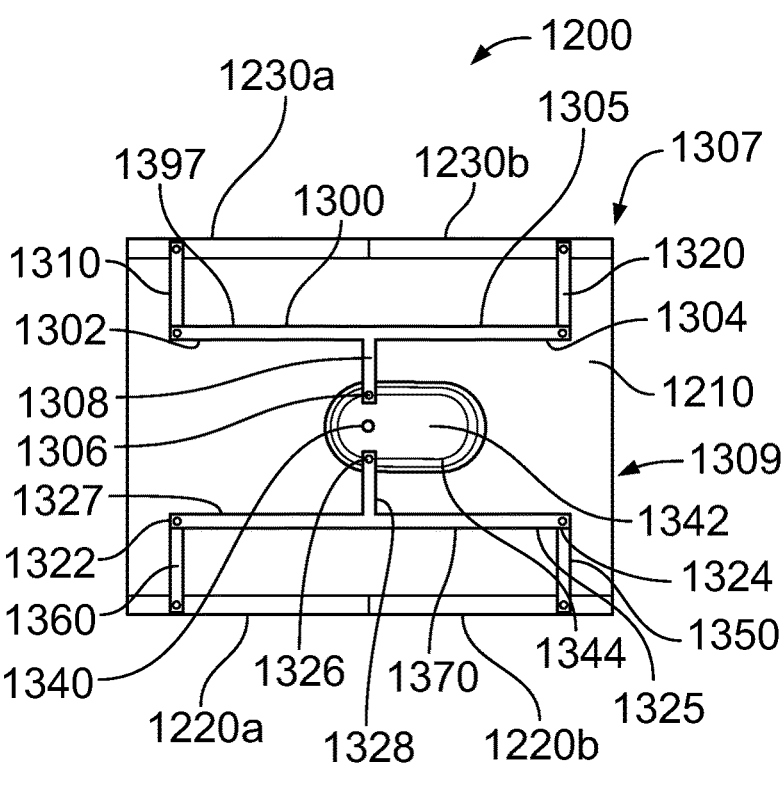
FIG. 17A is a perspective side view of cargo bay 1200 with upper cargo bay doors 1230a and 1230b in a closed position and lower cargo bay doors 1220a and 1220b in a closed position.
FIG. 17B is a perspective side view of cargo bay 1200 with upper cargo bay doors 1230a and 1230b in a partially open position and lower cargo bay doors 1220a and 1220b in a closed position.
Figure 17C:
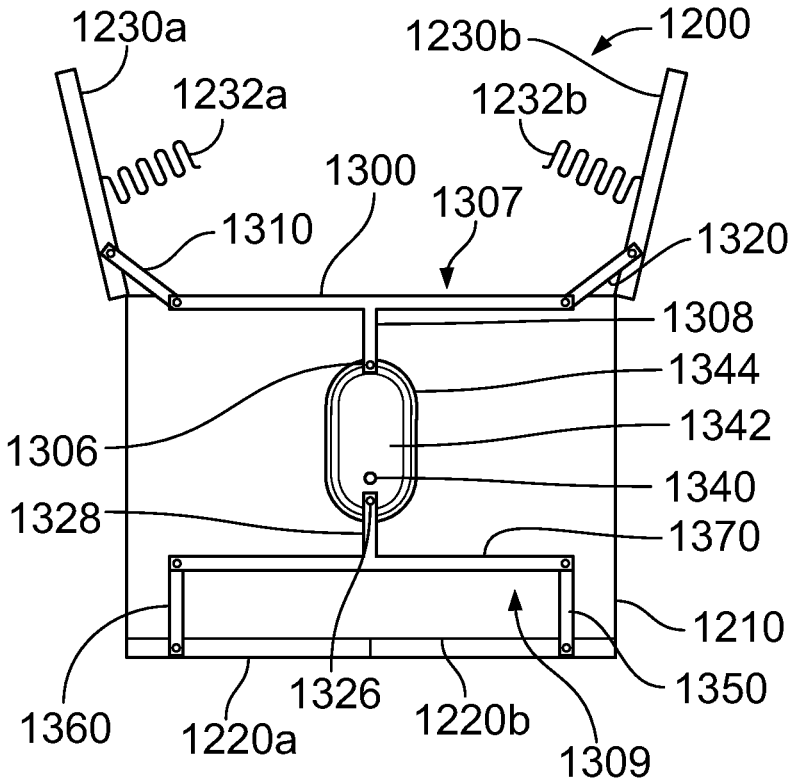
FIG. 17C is a perspective side view of cargo bay 1200 with upper cargo bay doors 1230a and 1230b in an open position and lower cargo bay doors 1220a and 1220b in a closed position.
Figure 18A:
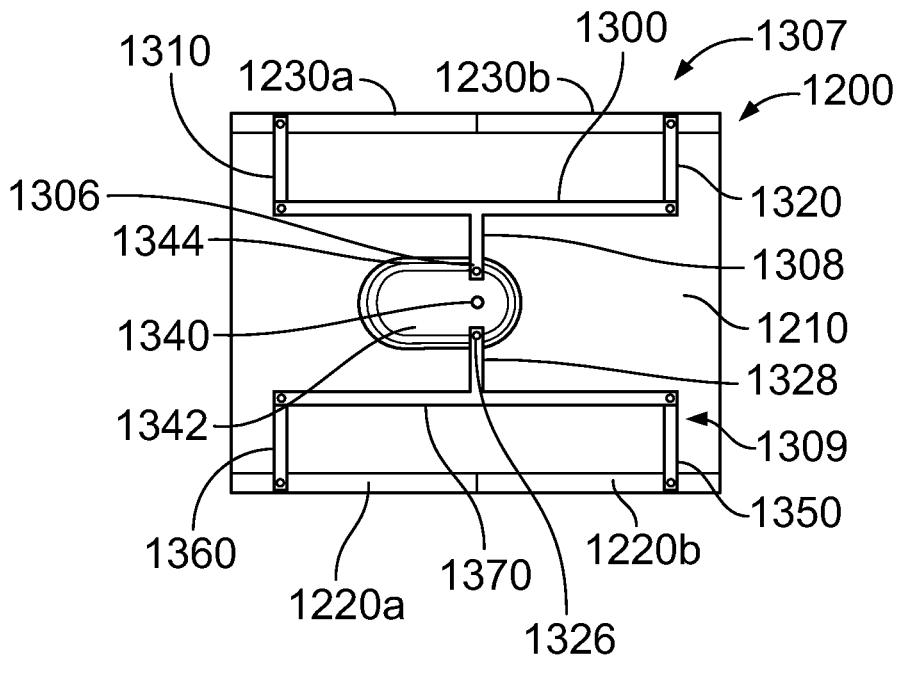
FIG. 18A is a perspective side view of cargo bay 1200 with upper cargo bay doors 1230a and 1230b in a closed position and lower cargo bay doors 1220a and 1220b in a closed position.

FIGS. 17A-17C and 18A-18C illustrate cargo bay 1200 that may be used in UAV 1400 shown in FIGS. 13A-13C. FIGS. 17A and 18A are perspective side views of cargo bay 1200 with upper cargo bay doors 1230a and 1230b in a closed position and lower cargo bay doors 1220a and 1220b in a closed position. Upper cargo bay doors 1230a and 1230b and lower cargo bay doors 1220a and 1220b may be opened and closed using actuator 1340, cam 1342, first linkage assembly 1309, and second linkage assembly 1307. First linkage assembly 1309 includes a first linkage arm 1328 having a first end 1326 movable by the cam 1342 and a second end 1324 pivotally mounted to a first end of a second linkage arm 1350, wherein a second end of the second linkage arm is pivotally mounted to the first lower cargo bay door 1220b. The first linkage arm 1328 has a third end 1322 pivotally mounted to a first end of a third linkage arm 1360, and a second end of the third linkage arm 1360 is pivotally mounted to second lower cargo bay door 1220a.

Second linkage assembly 1307 includes a fourth linkage arm 1308 having a first end 1302 movable by the cam 1342 and a second end 1324 pivotally mounted to a first end of a fifth linkage arm 1310, wherein a second end of the fifth linkage arm 1310 is pivotally mounted to the first upper cargo bay door 1230a. The fourth linkage arm 1308 has a third end 1304 pivotally mounted to a first end of a sixth linkage arm 1320, and a second end of the sixth linkage arm 1320 is pivotally mounted to second upper cargo bay door 1230b.

In addition, cam 1342 includes a groove 1344 in which a first pin positioned on the first end 1326 of the first linkage arm 1328 rides when the cam 1342 is rotated by actuator 1340, and a second pin is positioned on a first end 1306 of the fourth linkage arm 1308 that rides in the groove 1344 when the cam 1342 is rotated by the actuator 1340. As shown in the embodiments of FIGS. 17A-17C and 18A-18C, the groove 1344 has an oval shape, but could have other shapes such as a teardrop shape, and the groove 1344 extends around a periphery of the cam 1342.

Figure 18B:
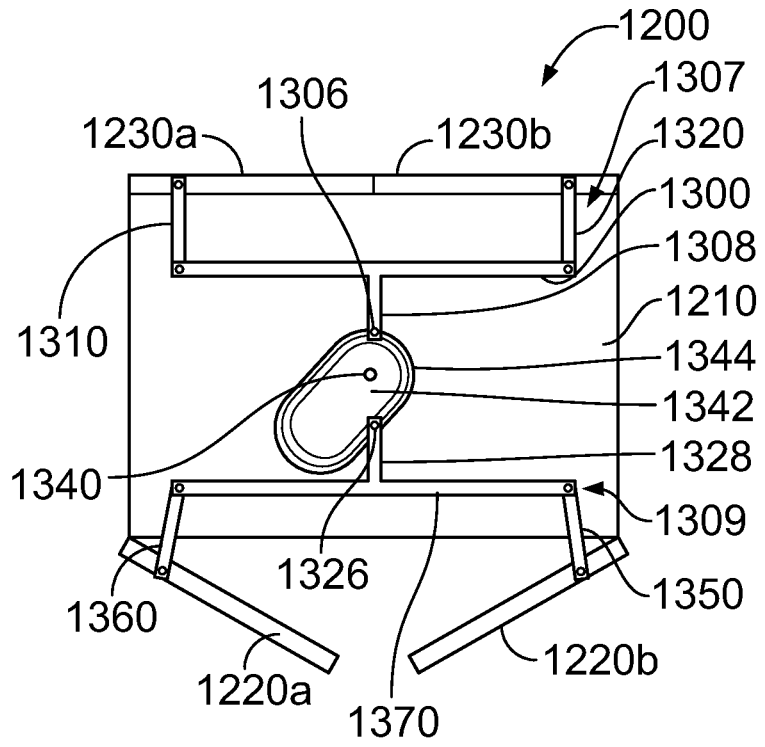
FIG. 18B is a perspective side view of cargo bay 1200 with upper cargo bay doors 1230a and 1230b in a closed position and lower cargo bay doors 1220a and 1220b in a partially open position.
Figure 18C:
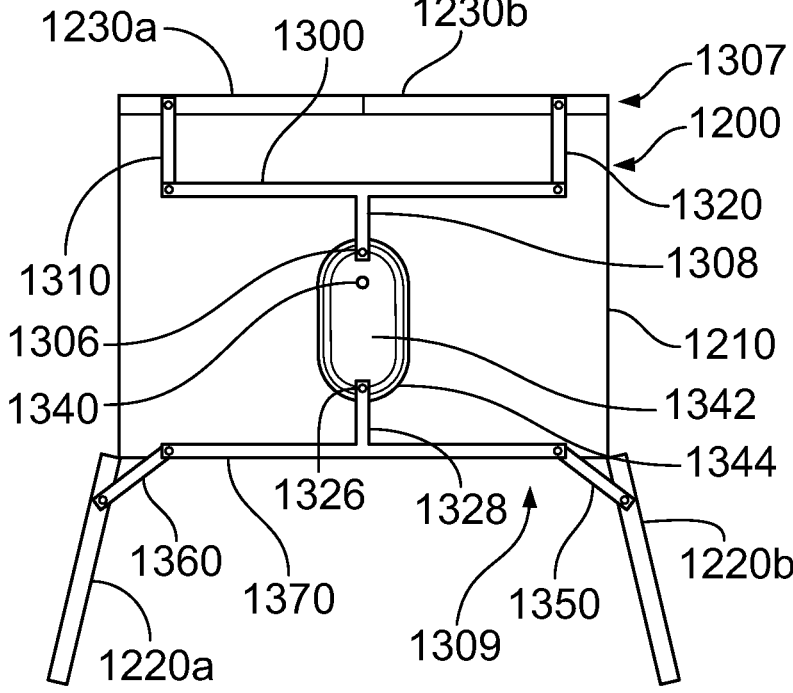
FIG. 18C is a perspective side view of cargo bay 1200 with upper cargo bay doors 1230a and 1230b in a closed position and lower cargo bay doors 1220a and 1220b in an open position.

FIG. 17B is a perspective side view of cargo bay 1200 with upper cargo bay doors 1230a and 1230b in a partially open position and lower cargo bay doors 1220a and 1220b in a closed position. FIG. 17C is a perspective side view of cargo bay 1200 with upper cargo bay doors 1230a and 1230b in an open position and lower cargo bay doors 1220a and 1220b in a closed position. FIG. 18B is a perspective side view of cargo bay 1200 with upper cargo bay doors 1230a and 1230b in a closed position and lower cargo bay doors 1220a and 1220b in a partially open position. FIG. 18C is a perspective side view of cargo bay 1200 with upper cargo bay doors 1230a and 1230b in a closed position and lower cargo bay doors 1220a and 1220b in an open position.

In the embodiments shown in FIGS. 16A-16C, 17A-17C, and 18A-18C cam 1342 is shown with a groove 1344. However, a groove 1344 in the cam 1342 is not required. Rather than using a groove, the cam 1342 may have an outer periphery that can simply be used to abut first end 1302 of first linkage arm 1328 and to abut first end 1306 of second linkage arm 1308 to move the first linkage assembly 1309 to open the lower cargo bay doors 1220a and 1220b and to move second linkage assembly 1307 to open upper cargo bay doors 1230a and 1230b. In such an embodiment, a spring may be used to close the doors when the cam is not acting on the linkage arms. Alternatively, in the case of the upper door(s), gravity may be used to close the door(s).

As shown in FIGS. 17B and 17C, an underside of the upper cargo bay door 1230a includes a spring 1232a and an underside of upper cargo bay door 1230b includes a spring 1232b. Springs 1232a and 1232b contact the payload when the payload is positioned in the cargo bay 1200, and a compression of the springs 1232a and 1232b is measurable, e.g. through current sensing through the actuator 1340, to determine when the payload is positioned in the cargo bay 1200. In addition, springs 1232a and 1232b may also provide an additional benefit of helping to eject the payload during delivery of the payload.

Actuators 1240 and 1340 described above are mounted to cam 1242 or 1342 in an offset manner to provide rotational movement of cam 1242 or 1342 to provide for relative up and down motion of the associate linkage assemblies to open and/or close the upper and lower cargo bay doors. Actuators 1240 and 1340 may be a servo motor. However, actuators 1240 and 1340 may be any mechanism that can impart rotational movement to the cam, such as a rotary or linear actuator, a hydraulic or pneumatic cylinder, and a rotary motor, as examples.

In the embodiment shown in FIGS. 17A-17C and 18A-18C, the first linkage assembly 1309, second linkage assembly 1307, and cam 1342 are shown positioned on cargo bay housing 1210. However, in many embodiments, the UAV 1400 (shown in FIGS. 13A-C) will not even include a cargo bay housing. Instead, the first linkage assembly 1309, second linkage assembly 1305, and cam 1342 will be positioned on or within the fuselage body of the UAV 1400. Lower cargo bay doors 1220a and 1220b and upper cargo bay doors 1230a and 1230b are also shown attached to the cargo bay housing 1210. However, lower cargo bay doors 1220a and 1220b, and upper cargo bay doors 1230a and 1230b, could simply be attached to the fuselage body itself, or attached to another component within the fuselage body of UAV 1400, and movable by actuator 1340, cam 1342, and first and second linkage assembly 1309 and 1307 to open and close cargo bay doors 1220a and 1220b, and 1230a and 1230b.

As shown in the Figures above, actuator 1340 is positioned between first end 1326 of first linkage arm 1328 of first linkage assembly 1309 and first end 1306 of fourth linkage arm 1308 of second linkage assembly 1307. Cam 1342 may be rotated upwardly by actuator 1340 to open upper cargo bay doors 1230a and 1230b for payload loading, and cam 1342 may be rotated downwardly by actuator 1340 to open lower cargo bay doors 1220a and 1220b for payload delivery. In the Figures above, the cargo bay and lower cargo bay door(s) are shown without using a winch, tether, and payload retriever described above. However, in some embodiments a winch, tether, and payload retriever could be used to lower a payload through the lower cargo bay door(s) to a delivery site.

In FIGS. 17A-17C and 18A-18C, first linkage arm 1328 of first linkage assembly 1309 is shown as a T-shaped member with extensions 1327 and 1370 extending from an upwardly extending member of the first linkage arm 1328. Similarly, fourth linkage arm 1308 of second linkage assembly 1307 is shown as a T-shaped member with extensions 1397 and 1305 extending from a downwardly extending member of fourth linkage arm 1308. However, rather than using a T-shaped member, two linkage separate linkage arms could be used instead.

A method of using the cargo bay 1200 includes (i) providing an unmanned aerial vehicle (UAV) having a fuselage body including a cavity that forms a cargo bay for transporting a payload; and a lower access opening providing an exit for the payload from the cargo bay, the lower access opening including a lower cargo bay door; an upper access opening providing an entrance for the payload into the cargo bay, the upper access opening including an upper cargo bay door; an actuator positioned in the fuselage body; a cam coupled to the actuator so as to be rotatable by the actuator; a first linkage assembly connected to the actuator via the cam and connected to the lower cargo bay door; a second linkage assembly connected to the actuator via the cam and connected to the upper cargo bay door; wherein the actuator, cam, and first linkage assembly are operable to open and/or close the lower cargo bay door; wherein the actuator, cam, and second linkage assembly are operable to open and/or close the upper cargo bay door; and wherein the cam is rotatable by the actuator to: a first position where the upper cargo bay door is in an open position for receiving the payload, and the lower cargo bay door is in a closed position; a second position where the upper cargo bay door is in a closed position and the lower cargo bay door is in a closed position during transport, and a third position where the lower cargo bay door is in an open position for dropping the payload; (ii) operating the actuator to cause the second linkage assembly to open the upper cargo bay door(s); (iii) positioning a payload into the cargo bay; (iv) moving the UAV to a payload delivery site; (v) operating the actuator to cause the first linkage assembly to open the lower cargo bay door(s); and (vi) dropping the payload from the cargo bay at the delivery site.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An unmanned aerial vehicle (UAV) comprising:
a fuselage body including:
    a cavity that forms a cargo bay for transporting a payload, and
    a lower access opening providing an exit for the payload from the cargo bay;
a lower cargo bay door including a first door rotatably attached to a first side of a bottom of the cargo bay, and a second door rotatably attached to a second side of the bottom of the cargo bay;
an actuator positioned in the fuselage body;
a linkage assembly connected to the actuator and operable to open and/or close the lower cargo bay door, the linkage assembly comprising:
first and second horns pivotally mounted to the actuator;
a first linkage member having a first end pivotally attached to the first horn and a second end pivotally attached to the first door; and
a second linkage member having a first end pivotally attached to the second horn and a second end pivotally attached to the second door,
wherein when the cargo bay door is in an open position, a force exerted from the door through the first linkage member extends through the first horn and through the actuator, and a force exerted from the second door through the second linkage member extends through the second horn and through the actuator.

2. The UAV of claim 1, wherein the first door is pivotally mounted to a cargo bay frame positioned in the fuselage body.

3. The UAV of claim 2, wherein the actuator is mounted to the cargo bay frame.

4. The UAV of claim 1, wherein the actuator is a rotary actuator.

5. The UAV of claim 4, wherein the rotary actuator is a servo motor.

6. The UAV of claim 1, wherein the lower cargo bay door may be opened by operating the actuator and linkage assembly such that the first door extends downwardly, and by operating the actuator and linkage assembly such that the second door extends downwardly.

7. The UAV of claim 1, wherein the lower cargo bay door may be closed by operating the actuator and linkage assembly such that the first door extends across the lower access opening, and by operating the actuator and linkage assembly such that the second door extends across the lower access opening.

8. The UAV of claim 1, wherein when the cargo bay door is in a closed position, a force exerted by the first linkage member on the first horn extends through the actuator.

9. The UAV of claim 1, wherein when the cargo bay door is in a closed position, a force exerted by the first linkage member on the first horn extends through the actuator, and a force exerted by the second linkage member on the second horn extends through the actuator.

10. An unmanned aerial vehicle (UAV) comprising:
a fuselage body including:
a cavity that forms a cargo bay for transporting a payload, and
    a lower access opening providing an exit for the payload from the cargo bay, the lower access opening including a lower cargo bay door;
an actuator positioned in the fuselage body;
a linkage assembly connected to the actuator and connected to the lower cargo bay door;
wherein the actuator and linkage assembly are operable to open and/or close the lower cargo bay door;
wherein a first horn is mounted to the actuator;
wherein the linkage assembly includes a first linkage member having a first end and a second end, the first end of the first linkage member pivotally attached to the first horn and the second end of the first linkage member pivotally attached to the cargo bay door;
wherein the actuator includes a rotatable output shaft;
wherein an attachment is positioned about the rotatable output shaft, and the attachment is movable relative to rotatable output shaft;

wherein the first horn is connected to the attachment, and the first horn is mounted to the actuator via the attachment;

wherein the lower cargo bay is biased into a closed position; and wherein an auxiliary actuator is positioned in the fuselage body of the UAV, and the auxiliary actuator is configured to decouple the lower cargo bay door from the rotatable output shaft of the actuator, thereby allowing the lower cargo bay door to close.

* * * * *